(12) United States Patent
Widjaja et al.

(10) Patent No.: US 10,062,125 B2
(45) Date of Patent: Aug. 28, 2018

(54) PRESENTING RATES FOR TRAVEL SERVICES

(71) Applicant: Expedia, Inc., Bellevue, WA (US)

(72) Inventors: Sendi Widjaja, Bellevue, WA (US); Kristin Dahl Acker, Bellevue, WA (US)

(73) Assignee: EXPEDIA, INC., Bellevue, WA (US)

(*) Notice: Subject to any disclaimer, the term of this patent is extended or adjusted under 35 U.S.C. 154(b) by 1025 days.

(21) Appl. No.: 14/297,893

(22) Filed: Jun. 6, 2014

(65) Prior Publication Data

US 2014/0358598 A1    Dec. 4, 2014

Related U.S. Application Data

(63) Continuation of application No. 12/167,132, filed on Jul. 2, 2008, now Pat. No. 8,768,860, which is a
(Continued)

(51) Int. Cl.
*G06Q 40/08* (2012.01)
*G06Q 50/14* (2012.01)
(Continued)

(52) U.S. Cl.
CPC ........... *G06Q 50/14* (2013.01); *G06Q 10/02* (2013.01); *G06Q 10/025* (2013.01); *G06Q 30/0283* (2013.01); *G06Q 30/06* (2013.01)

(58) Field of Classification Search
USPC .................. 382/100; 705/1.1, 7.11, 7.35, 13
See application file for complete search history.

(56) References Cited

U.S. PATENT DOCUMENTS

| 5,331,546 A | 7/1994 | Webber et al. |
| 5,689,418 A | 11/1997 | Monson |

(Continued)

FOREIGN PATENT DOCUMENTS

| AU | 2005264909 | 7/2011 |
| CA | 2535091 | 2/2005 |

(Continued)

OTHER PUBLICATIONS

"Mandalay Bay Resort and Casino Reservations", *EZBook*, https://ww4.mrgres.com/resnet/LANSAWEB?procfun+rn+resnet+bay+funcparms+UP(A2560):.>, as early as May 2004.

(Continued)

*Primary Examiner* — Akiba Kanelle Allen
(74) *Attorney, Agent, or Firm* — Knobbe, Martens, Olson & Bear, LLP

(57) ABSTRACT

A method and system are provided for presenting rates for travel services using dynamic pricing bands. The dynamic pricing bands represent approximate rates for travel services relative to available rates during or close to the proposed dates of travel, or at or near the proposed travel destination. Each dynamic pricing band is keyed to a particular color, intensity, pattern, sound, or other graphical and/or audio characteristic, thereby providing the consumer a sense of the seasonal, regional, day of week, or other variability of rates for travel services without having to compare actual numbers. The dynamic pricing bands are applied to an interactive presentation of rates for travel services to allow the consumer to explore possible rate variations for particular travel services in a manner that provides a birds-eye view, is intuitive and user-friendly.

18 Claims, 19 Drawing Sheets

Related U.S. Application Data continuation of application No. 10/897,600, filed on Jul. 23, 2004, now Pat. No. 7,415,419.

(60) Provisional application No. 60/581,142, filed on Jun. 18, 2004.

(51) Int. Cl.
*G06Q 10/02* (2012.01)
*G06Q 30/06* (2012.01)
*G06Q 30/02* (2012.01)

(56) References Cited

U.S. PATENT DOCUMENTS

| | | | |
|---|---|---|---|
| 5,845,229 | A | 12/1998 | Rawlins |
| 7,370,013 | B1 * | 5/2008 | Aziz .................... G06F 9/5072 705/40 |
| 7,415,419 | B2 | 8/2008 | Widjaja et al. |
| 8,768,860 | B2 | 7/2014 | Widjaja et al. |
| 2002/0156661 | A1 | 10/2002 | Jones |
| 2003/0023463 | A1 | 1/2003 | Dombroski et al. |
| 2003/0033164 | A1 | 2/2003 | Faltings et al. |
| 2003/0040946 | A1 | 2/2003 | Sprenger et al. |
| 2003/0110063 | A1 | 6/2003 | Among et al. |
| 2003/0171965 | A1 | 9/2003 | Ratzlaff et al. |
| 2004/0078251 | A1 | 4/2004 | DeMarcken |
| 2005/0033614 | A1 * | 2/2005 | Lettovsky ............ G06Q 10/025 705/5 |
| 2005/0138544 | A1 | 6/2005 | Beck et al. |
| 2005/0138564 | A1 * | 6/2005 | Fogg .................... G06F 3/0481 715/745 |
| 2005/0283389 | A1 | 12/2005 | Widjaja et al. |
| 2008/0294470 | A1 | 11/2008 | Widjaja et al. |

FOREIGN PATENT DOCUMENTS

| | | |
|---|---|---|
| CN | 1144570 A | 3/1997 |
| CN | 101111856 A | 1/2008 |
| CN | 102682342 A | 9/2012 |
| EP | 1345144 A2 | 9/2003 |
| EP | 1782352 A2 | 5/2007 |
| GB | 2366403 | 6/2002 |
| IN | 262655 | 9/2014 |
| JP | 5-166065 | 7/1993 |
| JP | 2003-196406 | 7/2003 |
| JP | 2004-171062 | 6/2004 |
| JP | 5198855 | 2/2013 |
| SG | 128163 | 10/2007 |
| WO | WO 1998/035311 | 8/1998 |
| WO | WO 2000/002153 | 1/2000 |
| WO | WO 2006/009647 | 4/2007 |

OTHER PUBLICATIONS

Dieberger, A.,"Navigation in Textual Virtual Environments Using a City Metaphor," Doctoral Dissertation, Vienna University of Technology, Vienna, Austria, Nov. 1994.

Dieberger, A., "A City Metaphor to Support Navigation in Complex Information Spaces," *Proceedings of Conference on Spatial Information Theory (COSIT '97)*, Laurel Highlands, Penn, Oct. 15-18, 1997.

Etzioni, Oren, "To buy or not to buy: mining airfare data to minimize ticket purchase price", Aug. 2003 KDD '03: Proceedings of the ninth ACM SIGKDD international conference on Knowledge discovery and data mining, Publisher: ACM.

Hearst, M., "User Interfaces and Visualization: 2. Human-Computer Interaction", *Modern Information Retrieval*, © 1999, <http://www.sims.berkeley.edu/~hearst/irbook/10/node3.html> [retrieved Apr. 28, 2004].

Nowell, L.T., Graphical Encoding in Information Visualization, *CHI 97 Electronic Publications: Doctoral Consortium*; © 1997, http://www.acm.org/sigchi/chi97/proceedings/doc/ltn2.htm> [retrieved Apr 8, 2004].

Salomon, G., "New Uses for Color", in B. Laurel (ed.) *The Art of Human-Computer Interface Design*, Addison-Wesley, Reading, Mass., 1990, pp. 269-278.

Screenshot of http://www.makemytrip.com as of Oct. 21, 2013 (according to Internet Archive on WayBackMachine). Screen shot obtained from https://web.archive.org/web/20131021072813/http://www.makemytrip.com/ on Jun. 5, 2014. Makemytrip.com was cited (undated) during prosecution of the Indian National Phase of PCT/US2005/020692.

Screenshot of http://www.airindia.com as of Oct. 16, 2013 (according to Internet Archive WayBackMachine). Screen shot obtained from https://web.archive.org/web/20131016204401/http://www.airindia.com/ on Jun. 5, 2014. "Air India Ltd. websites" was cited (undated) during prosecution of the Indian National Phase of PCT/US2005/020692.

Australian Office Action for Application No. 2005264909 dated Feb. 11, 2010, 2 pages.

Canadian Office Action for Application No. 2570790 dated Apr. 5, 2013, 4 pages.

Canadian Office Action for Application No. 2570790 dated May 15, 2014, 3 pages.

Canadian Office Action for Application No. 2570790 dated Jul. 14, 2015, 3 pages.

Canadian Office Action for Application No. 2570790 dated Aug. 19, 2016, 4 pages.

Canadian Office Action for Application No. 2570790 dated Jul. 20, 2017, 4 pages.

Chinese Office Action for Application No. 200580024078.6 dated Mar. 1, 2010, 7 pages.

Chinese Office Action for Application No. 200580024078.6 dated Oct. 19, 2011, 11 pages.

Chinese Office Action for Application No. 201210023607.2 dated Sep. 2, 2014, 12 pages.

Chinese Office Action for Application No. 201210023607.2 dated Apr. 10, 2015, 10 pages.

Chinese Office Action for Application No. 201210023607.2 dated Oct. 29, 2015, 8 pages.

Chinese Office Action for Application No. 201210023607.2 dated May 4, 2016, 8 pages.

European Supplemental Search Report for Application No. 05759549.8 dated Mar. 3, 2010, 2 pages.

European Examination Report for Application No. 05759549.8 dated May 20, 2010, 5 pages.

Indian Office Action for Application No. 3692/KOLNP/2006 dated Nov. 5, 2012, 2 pages.

Indian Office Action for Application No. 3692/KOLNP/2006 dated Oct. 18, 2013, 2 pages.

Indian Office Action for Application No. 3692/KOLNP/2006 dated Feb. 12, 2014, 2 pages.

International Search Report for PCT/US2005/020692 dated Dec. 4, 2006, 4 pages.

International Preliminary Report for Patentability for PCT/US2005/020692 dated Dec. 28, 2006, 4 pages.

Japanese Office Action for Application No. 2007-516594 dated Aug. 23, 2011, 9 pages.

Japanese Office Action for Application No. 2007-516594 dated Aug. 7, 2012, 5 pages.

* cited by examiner

SUMMARY OF RATE CALENDAR
MONTH AND PRICING BAND DISPLAY
6-MONTH CACHE EXAMPLE

| CHECK-IN MONTH | DISPLAY MONTHS | MONTHS USED IN PRICING BAND |
|---|---|---|
| M1 | M1, M2 | M1 THROUGH M6 |
| M2 | M2, M3 | M1 THROUGH M6 |
| M3 | M3, M4 | M1 THROUGH M6 |
| M4 | M4, M5 | M1 THROUGH M6 |
| M5 | M5, M6 | M1 THROUGH M6 |
| M6 (CHECK-OUT = M6) | M6 | M1 THROUGH M6 |
| M6 (CHECK-OUT >= M7) | M6, M7 (CLEAR IN ALL CELLS) | M1 THROUGH M6 |
| M7 | M6, M7 (CLEAR IN ALL CELLS) | M1 THROUGH M7 |
| M8 TO M12 | M7 (CLEAR), M8 (CLEAR) | N/A |
| UNDATED (DEFAULT CURRENT) | M1, M2 | M1 THROUGH M6 |

Fig. 8.

5-COLOR EXAMPLE OF PRICING BAND GENERATION

L = 150 (LEAST EXPENSIVE RATE)
M = 250 (MOST EXPENSIVE RATE)
R = 100 (M-L = 250 – 150, COMPUTED RANGE OF RATES)

| USE COLOR | FOR RATES EQUALING |
|---|---|
| LIGHTEST GREEN – BAND I | 150 |
| MEDIUM GREEN – BAND II | 151 TO (150 + 25) = 151 TO 175 |
| MEDIUM-DARK GREEN – BAND III | 176 TO (150 + 50) = 176 TO 200 |
| DARK GREEN – BAND IV | 201 TO (150 + 75) = 201 TO 225 |
| DARKEST GREEN – BAND V | 226 TO (150 + 100) = 226 TO 250 |

PRESENTING RATES FOR TRAVEL SERVICES

CROSS-REFERENCE TO RELATED APPLICATIONS

This application is a continuation of U.S. patent application Ser. No. 12/167,132, filed Jul. 2, 2008, which is a continuation of U.S. patent application Ser. No. 10/897,600, now U.S. Pat. No. 7,415,419, filed Jul. 23, 2004, which claims the benefit of U.S. Provisional Application No. 60/581,142, filed Jun. 18, 2004, the entire disclosures of which are incorporated by reference herein.

FIELD

The present invention relates in general to online travel services and, in particular, to a system and method for presenting rates for travel services to users online.

BACKGROUND

Increasing numbers of consumers are taking advantage of network-based, and Internet-based travel services that offer lodging, transportation reservations and ticketing directly to customers over the Internet. With such a service, a customer, using a computer connected to the travel service via the Internet, can purchase travel services/products from a dynamically changing inventory of services and products, such as hotel rooms, airline fares, car rentals, etc. Typically, such a travel service cooperates with a centralized computer reservation system ("CRS"). A CRS is a system/service that communicates with travel agents or transportation services for the purpose of providing up-to-date rate plan data, including a room rate (price for a hotel room on a particular date), fare (price for a trip or combination of routes comprising a trip), schedule (date and time of arrival and departure of a trip or flight), rules (which room rates and fares are valid under which circumstances) and availability (capacity for a particular trip or flight or hotel to provide accommodation at a particular fare or rate) in response to a query. This information is provided to the CRS by the lodging provider or transportation carriers, typically through third parties; however, a travel service can also cooperate with other databases, such as a local database reflecting specific relationships between carriers and the travel service, e.g., such as discount contracts or incentive programs. Accordingly, an Internet-based service can have access to many sources of travel inventory and prices. The CRS, may also be used to reserve and/or book travel components in travel packages, i.e., groupings of flight, hotel, car rentals, and or other travel services/products.

The business environment of a travel service is such that there are numerous ways of providing the same or a similar end-product to the consumer at a variety of prices. Due to travel provider-driven preferences, it may be cost-effective to price similar inventory differently. As an example, in the case of hotel reservations, the pricing structures are complex and dependent on a number of different variables, including check-in date, length of stay, availability, etc. Moreover, the prices among hotels can vary greatly depending on the season, events scheduled near the hotel, as well as the hotel's location and amenities. In the case of airline reservations, the number of ways that a consumer can travel from point A to point B is great when the number of airline carriers, different travel paths, hub locations and other particulars are considered. For this reason, the price of a particular hotel room, or flight segment from point A to point B, or other travel service/product may vary considerably across time, lodging providers, airline carriers, and the like.

Further, compounding price variations are price sensitivities, which can reflect, for example, an increase in demand for rooms reserved proximate to check-in time, or tickets reserved proximate to departure time. Additionally, incentive and discount programs negotiated with individual carriers and lodging providers can further affect the price offered by a travel service. Also, certain classes of room and flight inventory may have associated high or low demands, or high or low volume sales. Still further, rooms and flights included in a travel package may be eligible for further discounts over those not purchased as part of a package.

In addition, there are numerous consumer-driven preferences that can affect pricing as well. Some consumers will value individual characteristics of a given item of inventory differently. For example, in a hotel setting some consumer may prefer a particular hotel company, while others may only consider the location of the hotel. In the case of airline tickets, a consumer may not value when the flight (flying from one place to. the next) takes place, whereas another consumer may value a particular carrier over all others. These preferences can be factored into flights offered when the consumer specifies their preferences. For these reasons and others, there are numerous factors that can affect the value of the same or similar end-product.

In a conventional Internet-based travel service, a consumer enters very specific information concerning desired travel provider inventory, such as the type of hotel, and check-in and check-out dates. The Internet-based travel service queries remote servers for inventory that matches that specific query. In turn, the remote servers perform searches of their inventory databases to find matches for the query and return results to the Internet-based travel service for viewing by the consumer. However, a traditional remote server search in response to a query is limited.

One limitation results from the fact that previous attempts to present travel service information online have not always provided accurate real-time pricing and availability to consumers. Even when accurate travel service/product availability and pricing is capable of being provided in real-time, a still further drawback of previous solutions to providing travel service information online has been the inability to provide the consumer with meaningful comparisons between different rooms, flights, and the other services used while travelling. Obtaining information for individual travel services typically requires the consumer to navigate numerous Web pages, and only near the end of the process is a price provided. Most consumers have discovered that it is inconvenient and inefficient to follow this series of Web pages for various travel services for comparison purposes.

Some travel service providers have sought to address the problem by presenting pricing and availability information graphically in a weekly or monthly calendar format. However, the amount of detailed information presented is quite large, and is challenging for the typical consumer to digest without spending an inordinate amount of time, particularly when taking into account all of the price variations and sensitivities that can affect the pricing of a particular travel service/product on any given date. Moreover, presenting detailed information requires a higher degree of precision in determining the exact rates that cannot always be achieved in real-time.

In the context of advertising, some travel service providers have sought to address the problem by presenting pricing information graphically in a color-coded, shaded weekly or monthly calendar format. However, such information is necessarily static, and cannot convey up-to-the minute availability and rate changes that reflect changes in the market from one day or week to the next.

SUMMARY

In accordance with the present invention, a method and system are provided for presenting rates for travel services using dynamic pricing bands. The dynamic pricing bands represent approximate rates for travel services relative to available rates during or close to the proposed dates of travel, or at or near the proposed travel destination. Each dynamic pricing band is keyed to a particular color, intensity, pattern or other graphical and/or audio characteristic, thereby providing the consumer a sense of the seasonal, regional, day of week, or other variability for travel service rates without having to compare actual numbers. The dynamic pricing bands are applied to an interactive presentation of rates for travel services to allow the consumer to explore possible rate variations for particular travel services in a manner that provides a birds-eye view, is intuitive and user-friendly.

In one aspect, the dynamic pricing bands are computed from exact rates for the travel services using an algorithm in which the least and most expensive available rates establish a dynamic range of rates that is subdivided into a limited number of bands. Approximate rates are presented to a consumer using the limited number of bands according to where the exact rate for a particular travel service falls within the bands, thereby allowing the consumer to easily compare rates at a glance by comparing the limited number of bands.

In one aspect, the pricing bands are computed from exact rates available during or close to the proposed dates of travel, or at or near the travel destination, including exact rates for the month in which the travel commences plus an additional number of months to insure that the computed pricing bands represent approximate rates for travel services that are not unreasonably distorted by seasonal or other variations in the exact rates for a given travel service. The number of additional months of exact rates included in the computation of the pricing bands may vary according to the proposed dates of travel and/or type of travel service to optimize the presentation of approximate rates to the consumer using dynamic pricing bands.

In yet another aspect, the dynamic pricing bands used in the presentation of rates are displayed to the consumer in color, where a different color is used for each pricing band according to a color key. The different colors may include colors chosen to convey whether the approximate rate represented by the pricing band is expensive or inexpensive as compared to other approximate rates represented by other pricing bands. In alternate embodiments, the computed pricing bands may also be displayed to the consumer using a single color of varied intensity, using various patterns, or using other graphical characteristics, where the level of intensity of the color, pattern, or other graphical characteristic is similarly chosen to convey whether the approximate rate represented by the pricing band is expensive or inexpensive as compared to other approximate rates represented by other pricing bands.

In still another aspect, the rates are presented to the consumer using a calendar format, where the color, intensity, pattern, or other graphical characteristic chosen for the dynamic pricing bands are used for the background of the portions of the calendar that represent a particular date or dates of travel, such as the cells of a calendar presented in a grid format. In addition, the proposed dates of travel may be further highlighted to set them off from nearby dates of travel, allowing the consumer to quickly compare the approximates rates for the proposed dates of travel with the approximate rates for nearby dates, just by comparing the background color, intensity, or pattern of the respective portions of the calendar.

In yet another aspect, presentation of rates to the consumer using pricing bands further includes displaying the exact rates for a particular date of travel in response to a user selection. When the rates are displayed in a rate calendar format, the exact rates may be displayed to the consumer in response to a user input, such as the selection of the portion of the calendar that represents a particular date or dates of travel, such as the cells of a calendar presented in a grid format, or a user input selecting a link to a booking Web page to book the travel for the proposed dates of travel.

In another aspect, the rates are presented to the consumer using a map format, where the color, intensity, or pattern chosen for the pricing bands are used for the background of icons depicted in a map that represents particular travel services available in a particular region. When used to present rates in a map format, the rates that the dynamic pricing bands represent may include the average lowest daily rate for a travel service for the selected date or dates relative to the average lowest daily rates for the other travel services depicted in the map. When the proposed date or dates of travel are unavailable, the rates that the dynamic pricing bands represent may default to a median daily rate for travel services relative to the median daily rates for the other services depicted in the map within a predetermined period of time, e.g., two months. Regardless of whether average or median rates are used, the dynamic pricing bands are computed using an algorithm in which the least and most expensive rates establish a dynamic range of rates that is subdivided into a limited number of bands. The rates are presented to a consumer according to where the rate of a particular travel service falls within the dynamic pricing bands, thereby allowing the consumer to easily compare rates of travel services in a given region at a glance by comparing the respective limited number of pricing bands.

In accordance with yet other aspects of the present invention, a computer accessible medium for presenting rates for travel services using pricing bands is provided. The computer-accessible medium comprises data structures and computer-executable components comprising a rate presentation system and method, including rate calendar and rate map processes and interfaces to compute dynamic pricing bands and present rates for travel services to consumers in a manner that allows consumers to easily and quickly compare rates for travel services using the computed pricing bands. The data structures define the interfaces, process, rate data and dynamic pricing bands in a manner that is generally consistent with the above-described system and method. Likewise, the computer-executable components are capable of performing actions generally consistent with the above-described system and method.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 8 is a table summarizing an example of determining which rate data to include in the computation of the pricing bands used in the presentation of rates for travel services in accordance with an embodiment of the present invention;

FIG. 10 is a table summarizing an example of applying colors to represent the pricing bands in accordance with an embodiment of the present invention;

FIGS. 11-13 illustrate exemplary Web pages for presenting rates for travel services in a calendar format in accordance with an embodiment of the present invention;

DETAILED DESCRIPTION

Figure 1:
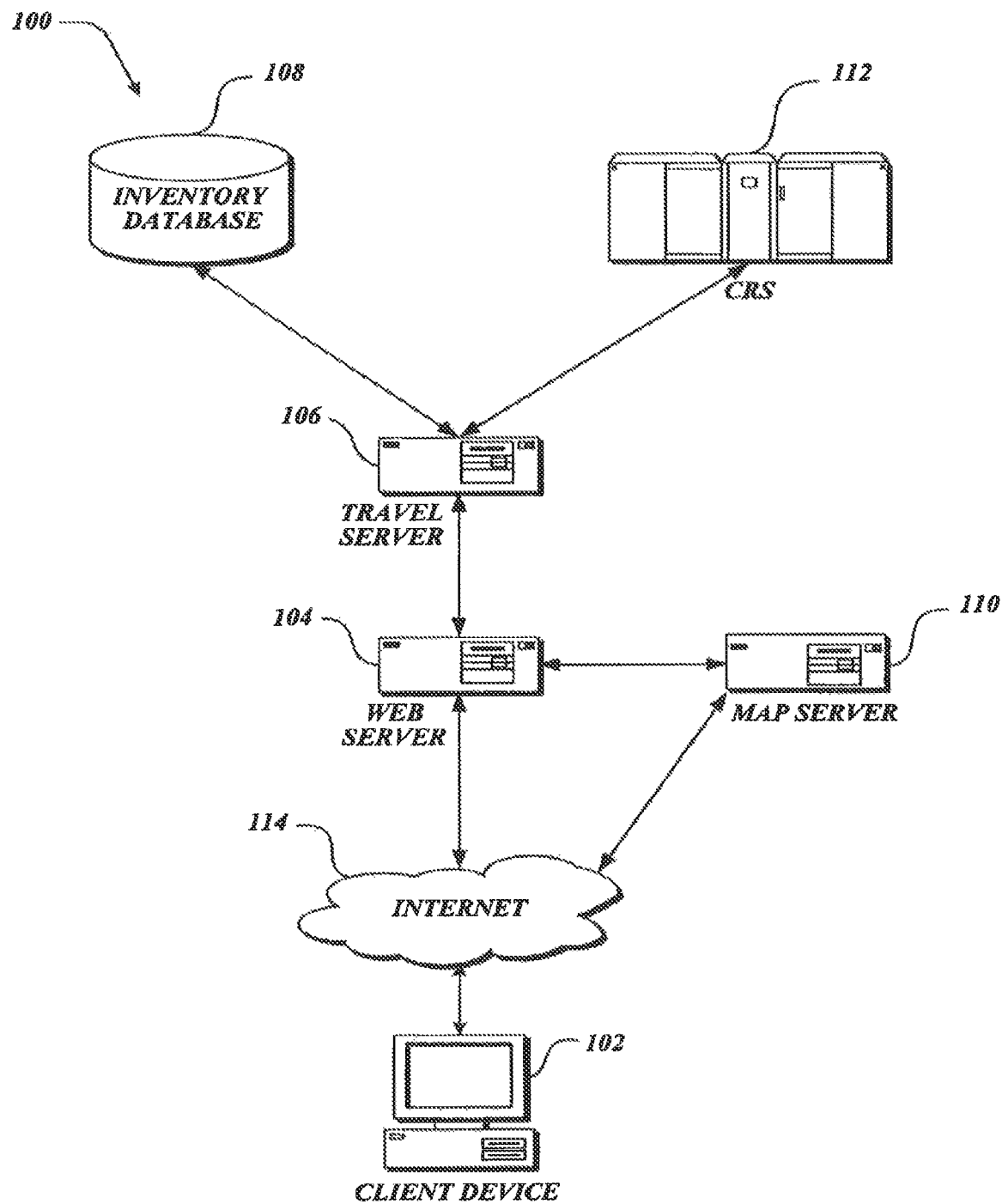
FIG. 1 is a pictorial diagram of a number of devices connected to an internetwork which provide a client device with a presentation of rates for travel services in response to a travel query in accordance with an embodiment of the present invention.

FIG. 1 illustrates an environment for implementing a system for presenting rates for travel services using pricing bands in accordance with an embodiment of the present invention. More specifically, FIG. 1 is a pictorial diagram of a number of devices connected to an internetwork which provide a client device with a presentation of rates for travel services in response to a travel query. The system 100 generally operates in a distributed computing environment comprising individual computer systems interconnected over a network (such as the Internet 114). However, it will be appreciated by those of ordinary skill in the art that the system 100 could equally function as a single, stand-alone computer system. In the described embodiment, a client device 102, a Web server 104, a travel server 106, and a map server 110 are interconnected over an internetwork, such as the Internet 114, or perhaps over an intranetwork. The client device 102, the Web server 104, travel server 106, and map server 110 are further described below in relation to FIGS. 2, 3, 4, and 5, respectively. The system 100 also comprises one or more connections to a centralized computer reservation system (CRS) 112, a system/service for providing up-to-date fare, schedule and availability information for travel services. Those of ordinary skill in the art will appreciate that more or less devices may be used in the exemplary system 100. For example, the functionality of the map server 110 may reside on the travel server 106, or some of the functionality of the travel server 106 may reside on the Web server 104. In still another embodiment, multiple Web servers 104, and/or travel servers 106 may be used in the system 100. Additionally, while only one client device 102 has been shown, it will be appreciated that many client devices may be used in system 100.

Figure 2:
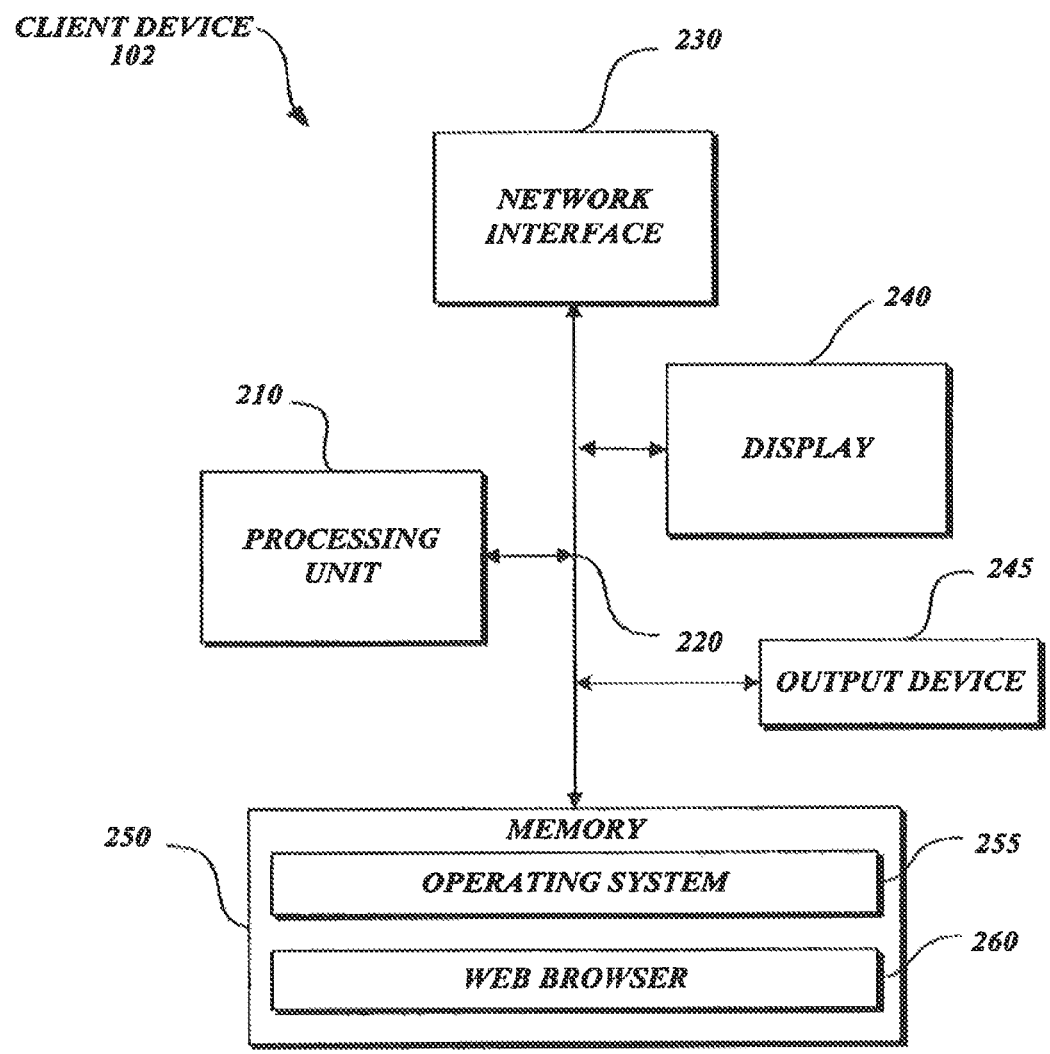
FIG. 2 is a block diagram illustrating several components of the client device shown in FIG. 1 used to request travel service rates in accordance with an embodiment of the present invention.

FIG. 2 depicts several of the key components of the client device 102. Those of ordinary skill in the art will appreciate that the client device 102 may include many more components than those shown in FIG. 2. However, it is not necessary that all of these generally conventional components be shown in order to disclose an enabling embodiment for practicing the present invention. As shown in FIG. 2, the client device 102 includes a network interface 230 for connecting to the Internet 114. Those of ordinary skill in the art will appreciate that the network interface 230 includes the necessary circuitry for such a connection, and is also constructed for use with the Transmission Control Protocol/Internet Protocol ("TCP/IP") protocol or other protocols such as the Internet Inter-ORB Protocol ("IIOP").

The client device 102 also includes a processing unit 210, a display 240, an output device 245 and a memory 250 all interconnected along with the network interface 230 via a bus 220. The output device 245 could be any type of device capable of receiving output from the client device 102, such as, but not limited to, a printer, a smart card reader, a plotter or a storage mechanism like a floppy, tape or DVD/CD-ROM drive. The memory 250 generally comprises a random access memory ("RAM"), a read-only memory ("ROM") and a permanent mass storage device, such as a disk drive. The memory 250 stores a Web browser 260 and an operating system 255. It will be appreciated that these software components may be loaded from a computer-readable medium into memory 250 of the client device 102 using a drive mechanism (not shown) associated with the computer-readable medium, such as a floppy, tape or DVD/CD-ROM drive or via the network interface 230.

Although an exemplary client device 102 has been described that generally conforms to a conventional general purpose computing device, those of ordinary skill in the art will appreciate that a client device 102 may be any of a great number of devices capable of communicating with the Internet 114 or with the Web server 104, e.g., a personal digital assistant, a workstation, a cell phone, a laptop, etc.

Figure 3:
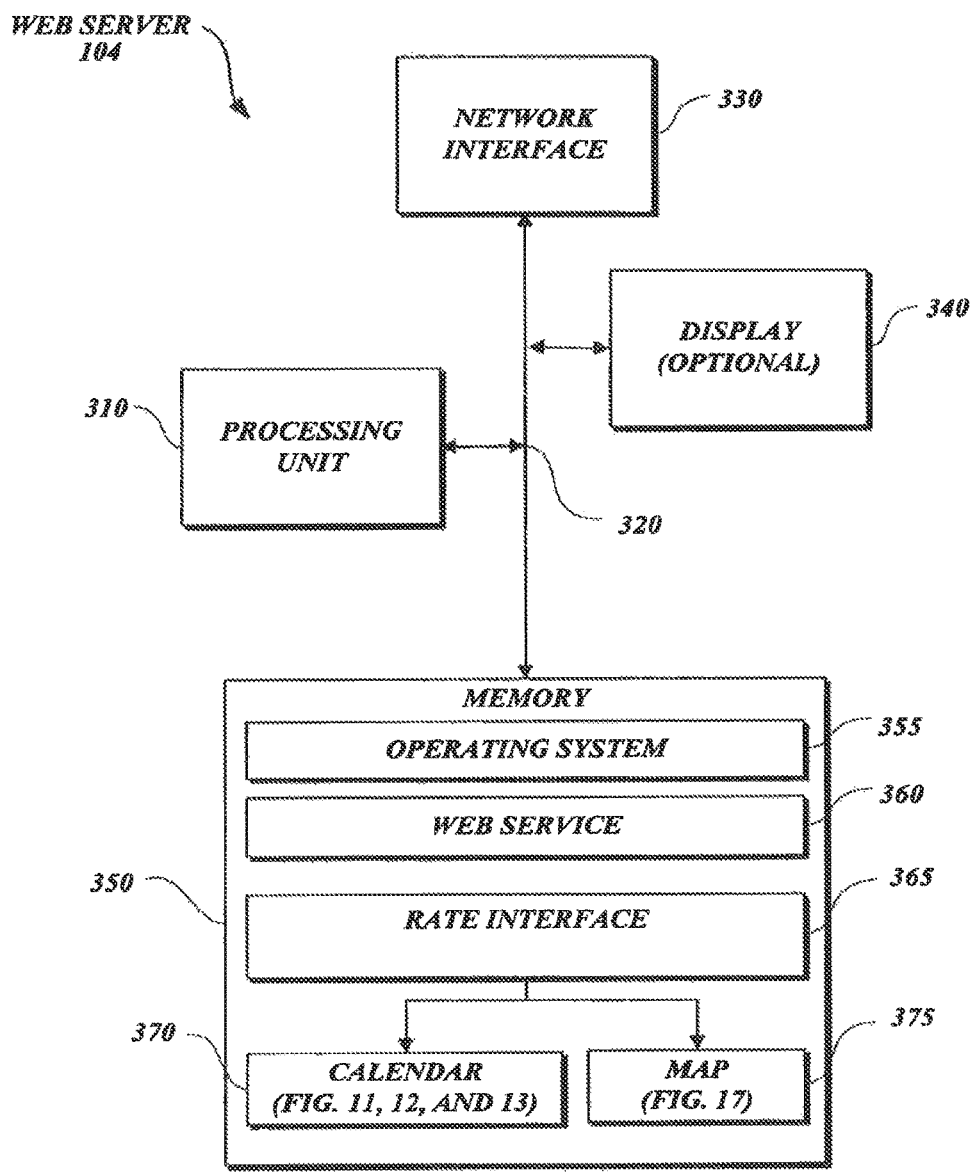
FIG. 3 is a block diagram illustrating several of the components of a Web server shown in FIG. 1 used to communicate with the client device and to present rates for travel services in accordance with an embodiment of the present invention.

FIG. 3 depicts several of the key components of the Web server 104. Those of ordinary skill in the art will appreciate that the Web server 104 includes many more components then those shown in FIG. 3. However, it is not necessary that all of these generally conventional components be shown in order to disclose an enabling embodiment for practicing the present invention. As shown in FIG. 3, the Web server 104 is connected to the Internet 114 via a network interface 330. Those of ordinary skill in the art will appreciate that the network interface 330 includes the necessary circuitry for connecting the Web server 104 to the Internet 114, and is also constructed for use with the TCP/IP protocol or other protocols, such as the HOP, the particular network configuration of the operating environment in which it is contained and a particular type of coupling medium.

The Web server 104 also includes a processing unit 310, an optional display 340, and a mass memory 350 all interconnected along with the network interface 330 via a bus 320. The memory 350 generally comprises RAM, ROM, and one or more permanent mass storage devices, such as a hard disk drive, tape drive, optical drive, floppy disk drive, or combination thereof. The mass memory 350 stores the program code and data necessary for receiving, processing, formatting, requesting and sending rates for travel services, as well as, supplying the results of that processing to other devices such as the client device 102 in accordance with an embodiment of the present invention. More specifically, the memory 350 stores a Web service 360 for providing Web connectivity to the Web for computers with Web browsers, such as the client device 102 having Web browser 260. Additionally, the memory 350 stores a rate interface process 365 for an interactive presentation of approximate rates for travel services to consumers using pricing bands in a calendar 370 or map 375 format in accordance with an embodiment of the present invention. The travel services may be any type of services related to travel, including but not limited to lodging and transportation. The rate interface process 365 is described in greater detail below, with reference to FIGS. 11-13 for the calendar format, and FIG. 17 for the map format.

It will be appreciated that the aforementioned software components may be loaded from a computer-readable medium into mass memory 350 of the Web server 104 using a drive mechanism (not shown) associated with the computer-readable medium, such as floppy, tape or DVD/CD-ROM drive or via the network interface 330.

Although an exemplary Web server 104 has been described that generally conforms to a conventional general purpose computing device, those of ordinary skill in the art will appreciate that a Web server 104 may be any of a great number of devices capable of communicating via the Internet 114, or providing Web pages in a network.

Figure 4:
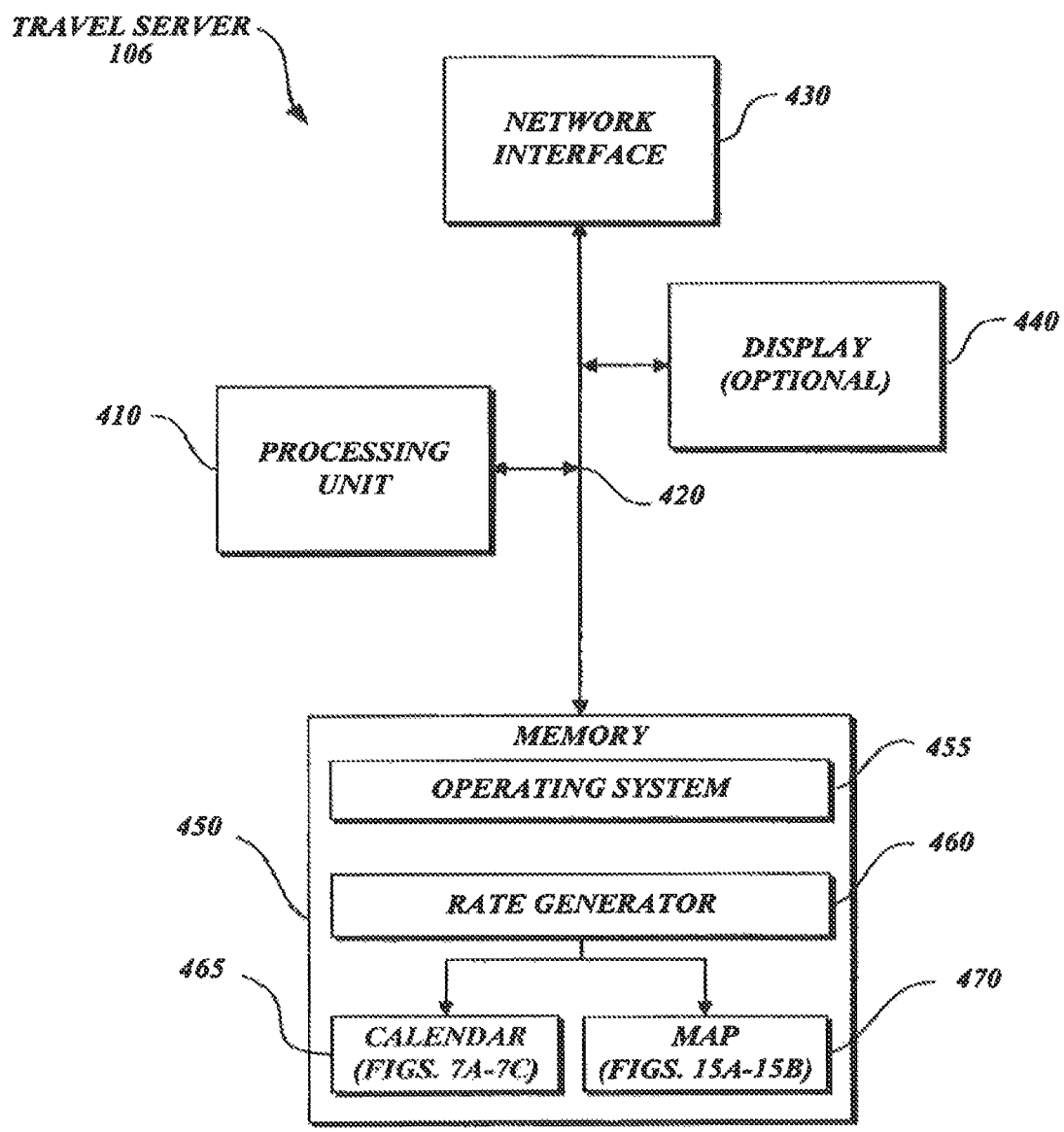
FIG. 4 is a block diagram illustrating several of the components of a travel server shown in FIG. 1 used to generate presentations of rates for travel services in response to a travel query in accordance with an embodiment of the present invention.

FIG. 4 depicts several of the key components of the travel server 106. Those of ordinary skill in the art will appreciate that the travel server 106 includes many more components then those shown in FIG. 4. However, it is not necessary that all of these generally conventional components be shown in order to disclose an enabling embodiment for practicing the present invention. As shown in FIG. 4, the travel server 106 is connected to the Internet 114 via a network interface 430. Those of ordinary skill in the art will appreciate that the network interface 430 includes the necessary circuitry for connecting the travel server 106 to the Internet 114, and is also constructed for use with the TCP/IP protocol or the next generation protocols, such as the nap, the particular network configuration of the operating environment in which it is contained and a particular type of coupling medium.

The travel server 106 also includes a processing unit 410, an optional display 440, and a mass memory 450 all interconnected along with the network interface 430 via a bus 420. The memory 450 generally comprises RAM, ROM, and one or more permanent mass storage devices, such as a hard disk drive, tape drive, optical drive, floppy disk drive, or combination thereof. The mass memory 450 stores the program code and data necessary for receiving, processing, formatting, requesting and sending rates for travel services, as well as, supplying the results of that processing to other devices such as the Web server 104 and client device 102 in accordance with an embodiment of the present invention More specifically, the memory 450 stores a rate presenter process 460 to generate an interactive presentation of approximate rates for travel services using pricing bands in a calendar 465 or a map 470 format, as shown and described in further detail with reference to FIGS. 7A-7C and FIGS. 15A-15B, respectively. Briefly, the rate presenter generates an interactive presentation of approximate rates for travel services using pricing bands in response to a consumer request for rates for travel services during a particular time period, or in a particular location, according to the consumer's specifications. It will be appreciated that the aforementioned software components may be loaded from a computer-readable medium into mass memory 450 of the travel server 106 using a drive mechanism (not shown) associated with the computer-readable medium, such as floppy, tape or DVD/CD-ROM drive or via the network interface 430.

Although an exemplary travel server 106 has been described that generally conforms to a single conventional general purpose computing device, those of ordinary skill in the art will appreciate that a travel server 106 may be a combination of computing devices or components, coordinated to communicate with the Web server 104 over a network.

Figure 5:
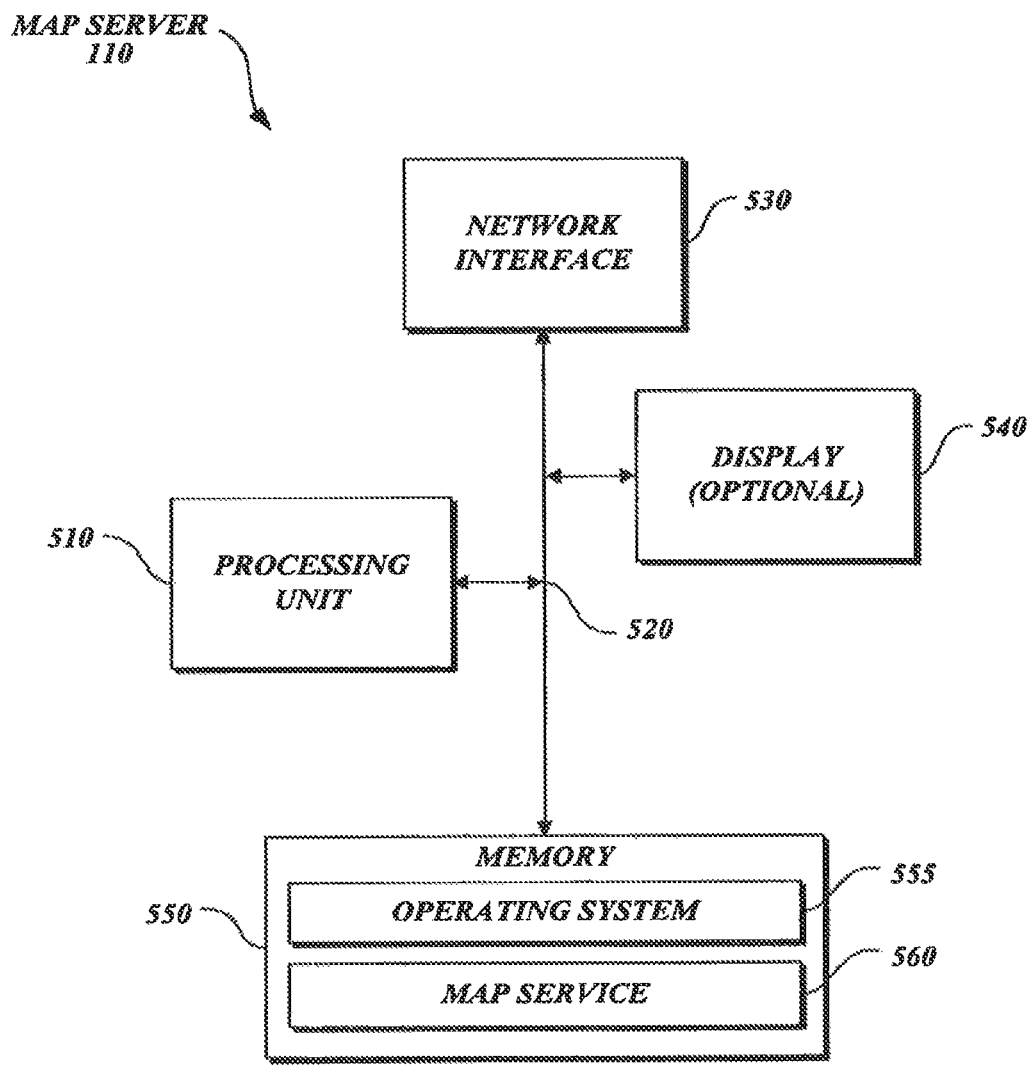
FIG. 5 is a block diagram illustrating several of the components of a map server shown in FIG. 1 used to render maps and icons for travel services in response to a travel query in accordance with an embodiment of the present invention.

FIG. 5 depicts several of the key components of the map server 110. Those of ordinary skill in the art will appreciate that the map server 110 includes many more components then those shown in FIG. 5. However, it is not necessary that all of these generally conventional components be shown in order to disclose an enabling embodiment for practicing the present invention. As shown in FIG. 5, the map server 110 is connected to the Internet 114 via a network interface 530. Those of ordinary skill in the art will appreciate that the network interface 530 includes the necessary circuitry for connecting the map server 110 to the Internet 114, and is also constructed for use with the TCP/IP protocol or the next generation protocols, such as the HOP, the particular network configuration of the operating environment in which it is contained and a particular type of coupling medium.

The map server 110 also includes a processing unit 510, an optional display 540, and a mass memory 550 all interconnected along with the network interface 530 via a bus 520. The memory 550 generally comprises RAM, ROM, and one or more permanent mass storage devices, such as a hard disk drive, tape drive, optical drive, floppy disk drive, or combination thereof. The mass memory 550 stores the program code and data necessary for rendering and serving a map of a travel destination in response to a request from devices such as the travel server 106, as well as, supplying the results of that processing to other devices such as the Web server 104 and client device 102 in accordance with an embodiment of the present invention More specifically, the memory 550 stores a map service 560 to render and serve an interactive map of a travel destination and surrounding area, including icons for travel services in the travel destination and surrounding area, in response to a request from another device such as the travel server 106, the request including the location parameters of the desired travel services in the travel destination and surrounding area, e.g., the longitude and latitude designations. It will be appreciated that the aforementioned software components may be loaded from a computer-readable medium into mass memory 550 of the map server 110 using a drive mechanism (not shown) associated with the computer-readable medium, such as floppy, tape or DVD/CD-ROM drive or via the network interface 530.

Although an exemplary map server 110 has been described that generally conforms to a single conventional general purpose computing device, those of ordinary skill in the art will appreciate that a map server 110 may be a combination of computing devices or components, coordinated to communicate with the travel server 106 and other devices over a network.

Figure 6:
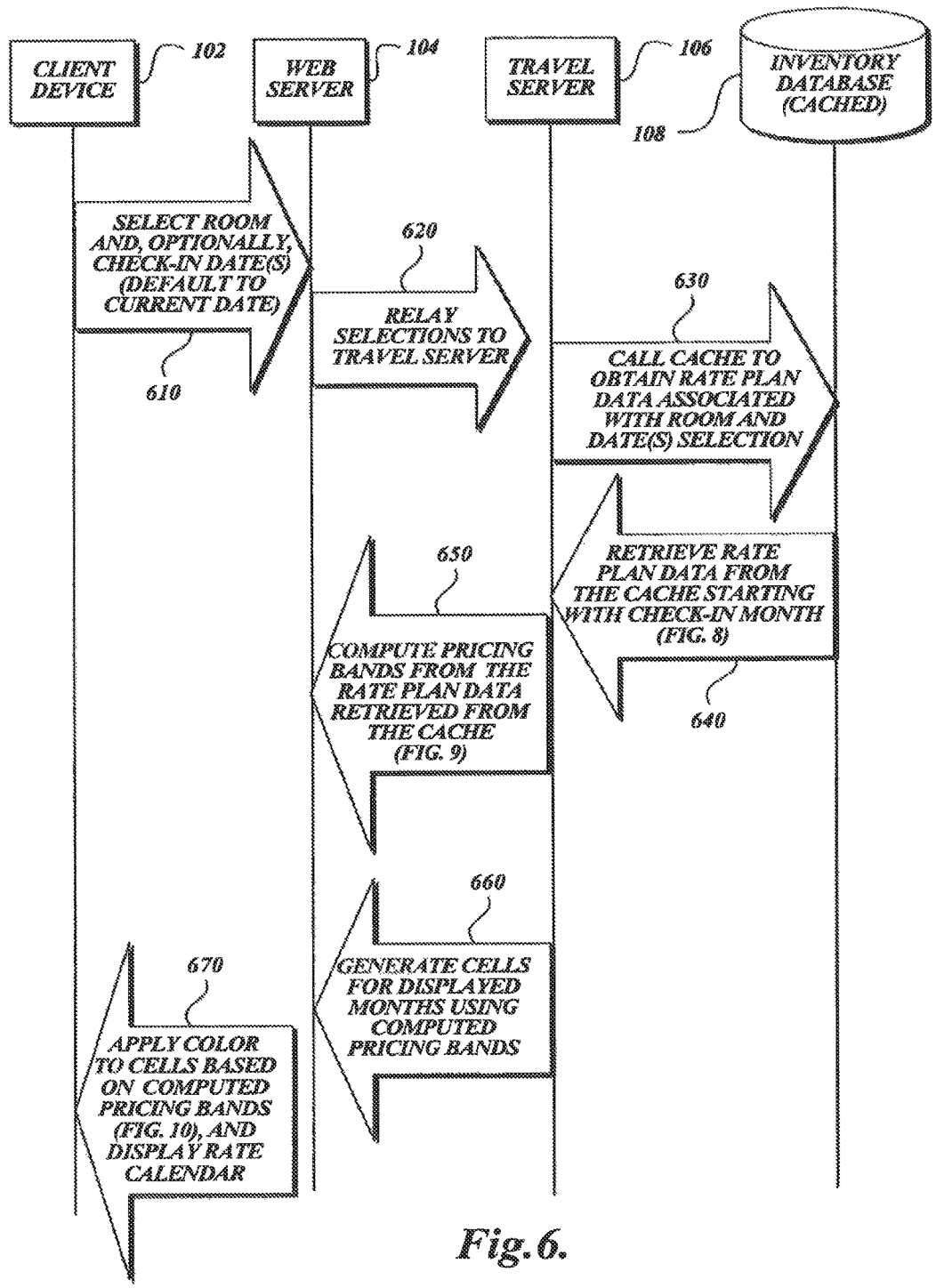
FIG. 6 is a diagram illustrating the actions taken by the devices illustrated in FIG. 1 to present rates for travel services in a calendar format in response to a travel query in accordance with an embodiment of the present invention.

To better illustrate the presentation of rates for travel services to a consumer using pricing bands using a calendar interface, FIG. 6 is a diagram illustrating one embodiment of interactions taken by the devices of system 100 illustrated in FIG. 1 to present rates for travel services using pricing bands in a calendar format in response to a travel query in accordance with an embodiment of the present invention. While lodging services are used below to describe an illustrative travel service for which rates are presented using pricing bands according to an embodiment of the present invention, those of ordinary skill in the art will appreciate that the present invention applies equally well to other types of travel services, such as, but not limited to, air, train, bus, cruise, ferry or other forms of transportation services. The devices of the system 100 illustrated in FIG. 6 include a client device 102, Web server 104, and a travel server 106, respectively, and an inventory database 108 that may be accessible directly, or indirectly through a CRS 112, as described with reference to FIG. 1. The interactions of and the processes performed by the various devices are illustrated and described in greater detail with reference to FIGS. 7A-7C.

Returning to FIG. 6, the presentation of rates for travel services to a consumer using pricing bands is initiated at interactions 610, 620 when a Web server 104 relays a consumer's selection of a hotel room and, optionally, the proposed dates of travel, such as the check-in and check-out dates, or the current date as the default, from the client device 102 to the travel server 106 via an interactive rate calendar interface (such as the rate calendar interface 1100 illustrated in FIG. 11) that is accessible to the client device 102 and is hosted on the Web server 104.

At interaction 630, once the travel server 106 receives the consumer's selections, the travel server 106 calls a cache of the inventory database 108 to obtain rate plan data associated with the hotel room and proposed dates of travel selections. At interaction 640, the travel server 106 retrieves the rate plan data from the cache, starting with the check-in month plus an additional number of months of rate plan data in accordance with the rules set forth in detail and further described below with reference to FIG. 8. In a typical example, the travel server" 106 retrieves six months of rate plan data for the selected travel service (e.g., the selected hotel room) starting with the rate plan data for the proposed check-in month. However, other amounts of rate plan data may be retrieved from the cache, either arbitrarily or depending on the type of travel service or proposed dates.

At interaction 650, the travel server 106 computes a limited number of pricing bands from the rate plan data that was retrieved from the cache according to a pricing band algorithm, as set forth in detail and further described below with reference to FIG. 9. In general, the pricing bands represent dynamic ranges of rates computed from the least and most expensive rates in the retrieved rate plan data. In one embodiment, the pricing bands are generally limited in number to no more than five (5) or so bands to facilitate easy comparison of rates by the consumer. However, the number may vary depending on the implementation. For example, when using the bands to represent rates for travel services that are particularly volatile, such as airfares, the number of pricing bands may increase or decrease to accommodate larger ranges or smaller ranges of rates. At interaction 660, the travel server 106 combines the computed pricing bands with an interactive rate calendar interface to allow the consumer to explore the possible rate variations for the selected travel service in an intuitive and user-friendly manner. As will be further described with reference to FIGS. 7A-7C, the travel server 106 generates the cells for each date of the month or months that are to be displayed in the interactive rate calendar, and associates a particular computed pricing band with each cell depending on where the exact rate for each date falls within the dynamic ranges of the bands.

At interaction 670, the Web server applies a graphical characteristic to the cells based on the computed pricing band associated with the cell as described in further detail below with reference to FIG. 10. In a typical embodiment, the graphical characteristic is a color chosen to convey whether the approximate rate for a travel service on a particular date (a calendar cell) is expensive or inexpensive as compared to rates on other dates (other cells).

Figure 7A:
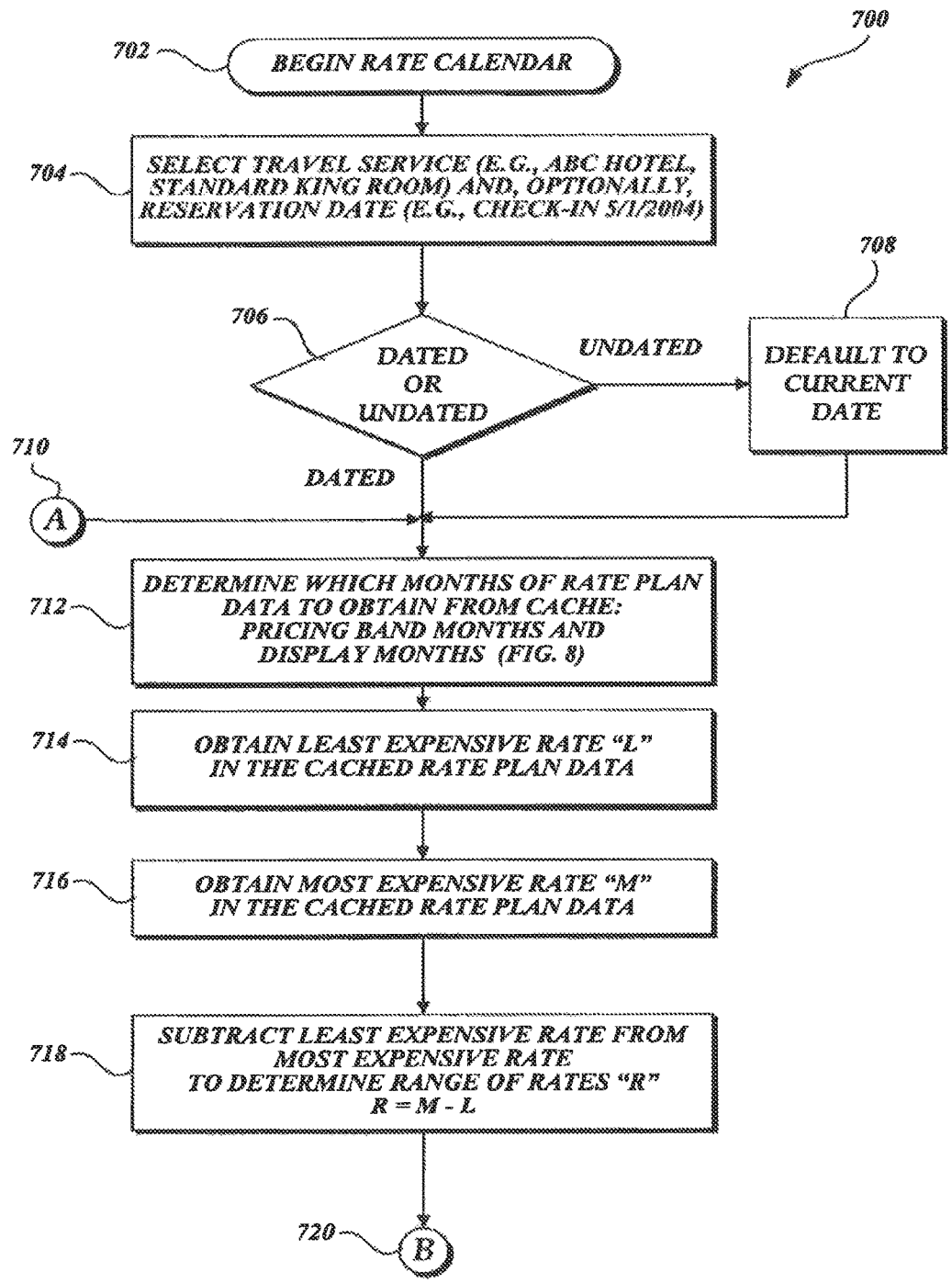
FIGS. 7A-7C is an overview flow diagram illustrating logic implemented using the devices illustrated in FIG. 1 to present rates for travel services in a calendar format in accordance with an embodiment of the present invention.
Figure 7B:
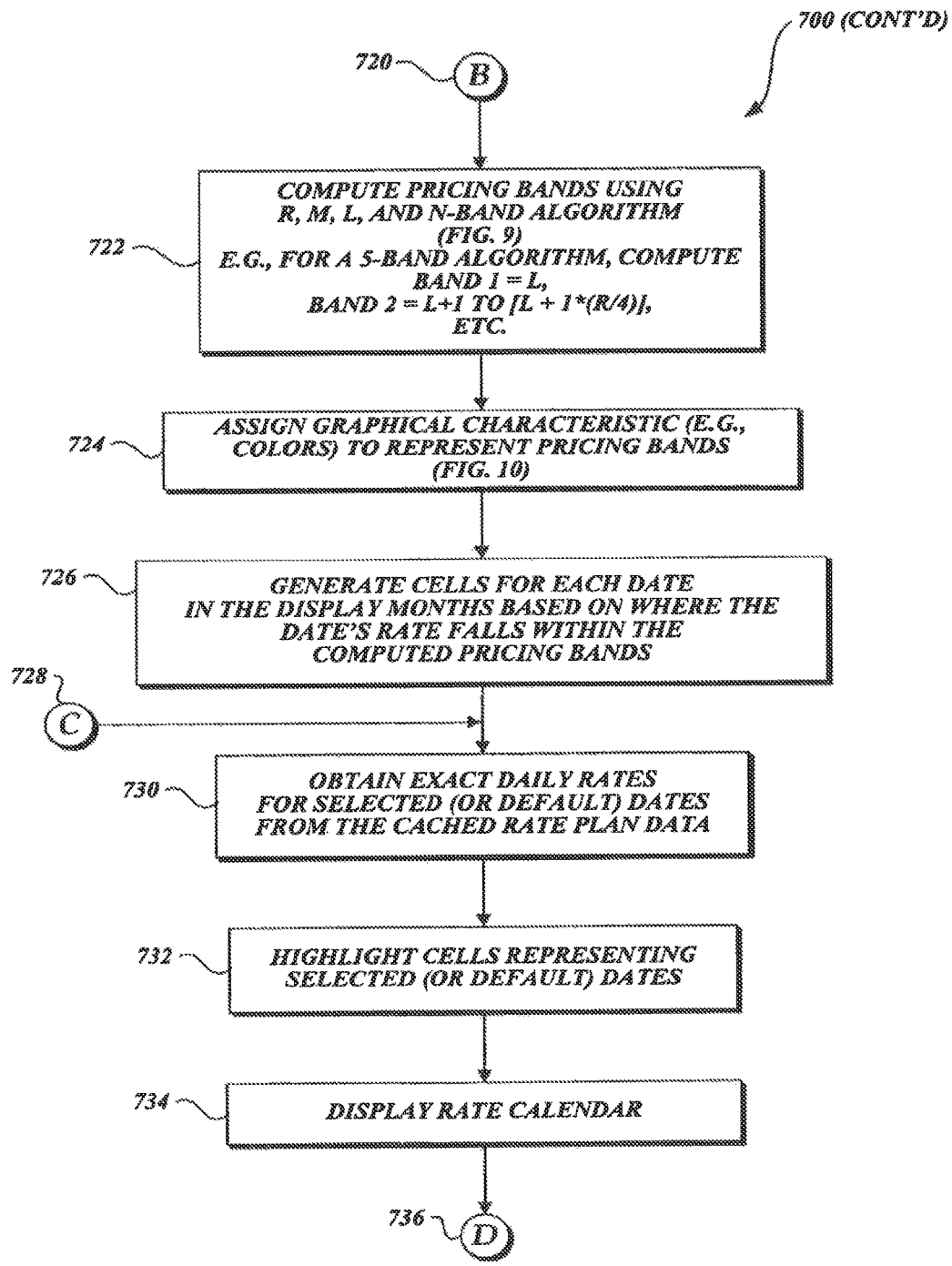
Figure 7C:
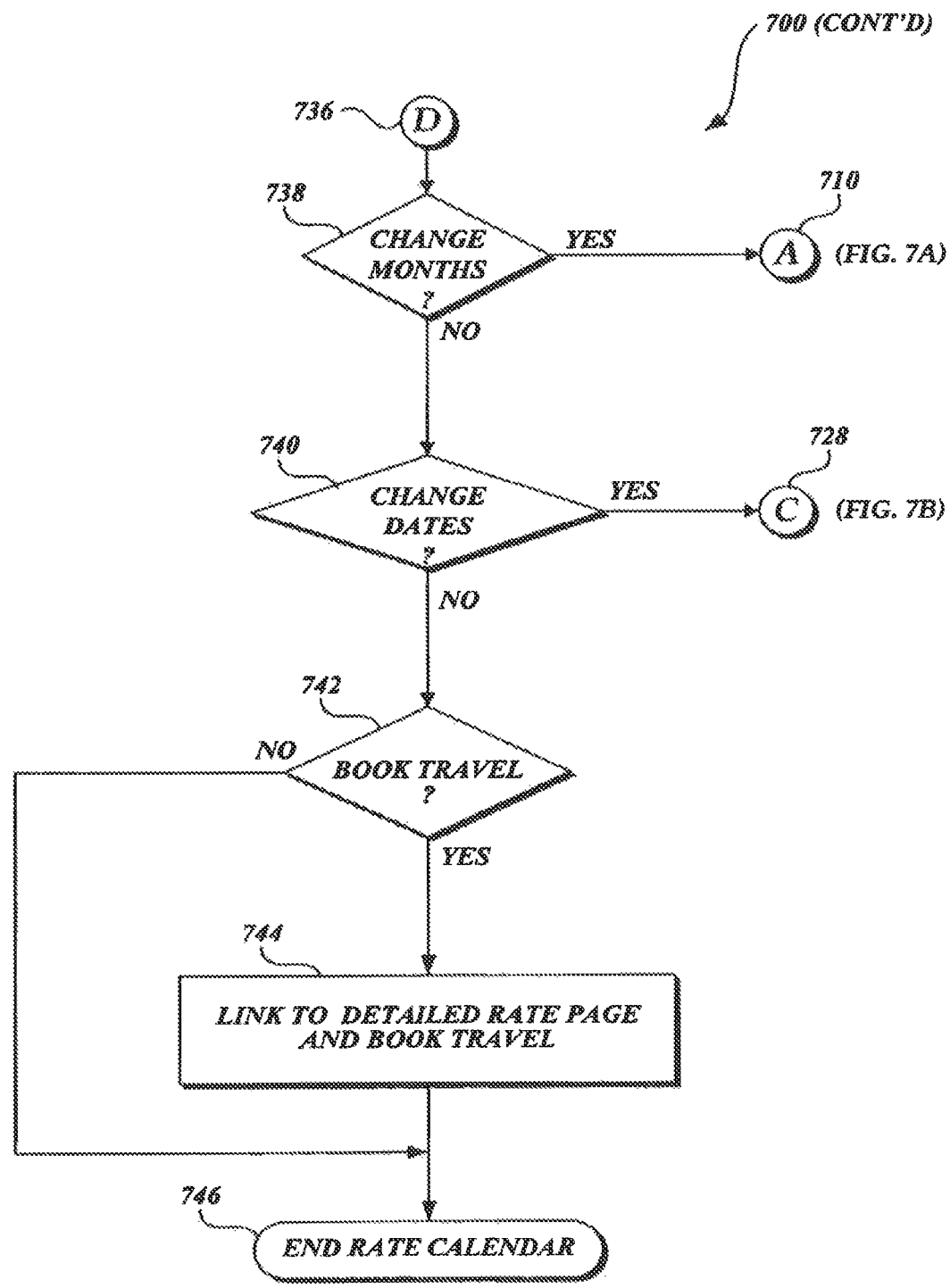

FIGS. 7A-7C are overview flow diagrams illustrating logic implemented using the devices of system 100 illustrated in FIG. 1 to present rates for travel services in a calendar format in accordance with an embodiment of the present invention. A rate presenter process 700 implemented by the travel server 106 begins in block 702 and continues at process block 704 to receive the consumer's selection of a travel service, such as a standard king bed hotel room in the ABC Hotel, and optionally, the desired reservation date, such as a check-in date of May 1, 2004 for one week, checking out on May 8, 2004. At decision block 706 the rate presenter process 700 determines whether the consumer's selection is dated or undated. If undated, at process block 708 the rate presenter process 700 defaults to the current date. At process block 712, the rate presenter process 700 determines which months of the rate plan data for the consumer's selected travel service to obtain from a cache of rate plan data obtained from the inventory database 108. The cache is a subset of the rate plan data that is stored in memory 450 and periodically refreshed to facilitate rapid access to current rate plan data while minimizing database access delays. The amount of rate plan data stored in the cache at any given time is typically six months, although the cache may contain more or less than six months of data depending on the implementation. The determination of which months of the rate plan data to obtain is set forth in further detail in FIG. 8.

FIG. 8 is a table summarizing an example of determining which rate data to include in the computation of the dynamic pricing bands used in the presentation of rates for travel services in accordance with an embodiment of the present invention. As illustrated, the example is for a six-month cache of data, and summarizes which months are displayed in the rate calendar 820, and which months are included in the computation of the dynamic pricing bands 830, based on the consumer's selection of check-in month 810. For example, in a dated search, when the check-in month occurs in the first month, M1, of the six-month cache, at 840A, the months that will be displayed in the rate calendar, i.e., the display months, are the first and second months of the cache, M1 and M2, and the months that will be used in computing the pricing bands, i.e., the pricing band months, are the first through sixth months, M1 through M6. Similarly, when the check-in month occurs in the second month, M2, of the six-month cache, at 840B, the display months are the second and third months of the cache, M2 and M3, and the pricing band months are the first through sixth months, M1 through M6. When the check-in month occurs in the third through fifth month, the rate data is included in a manner similar to when the check-in month occurs in the first and second months. However, when the check-in month occurs in the sixth month, the determination of display months and computation months depends on whether the check-out month occurs within the six-month cache or is outside the cache. When the check-out month also occurs within the sixth month, at 840F, the display months are the fifth and sixth months of the cache, M5 and M6, and the pricing band months are again the first through sixth months, M1 through M6. However, when the check-out month occurs beyond the sixth month (outside of the cache), at 840G, the sixth month of the cache will be displayed in the rate calendar, M6, as well as the seventh month, M7, but without data in any of the cells of the seventh month. The months used in computing the pricing bands are again the first through sixth months, M1 through M6.

When the check-in month occurs in the seventh month beyond the sixth month of the cache, the display months are the sixth and seventh months, M6 and M7, but will be displayed without data in any of the cells of either month. The pricing band months are the first through sixth months, M1 through M6, plus optionally an additional month of data, M7, obtained directly from the inventory database 108, i.e., not from the cache. When the check-in month occurs in the eighth through twelfth month, M8 to M12, at 840I, then the display months are again the sixth and seventh months, M6 and M7, but again without data in any of the cells of either month. Moreover, no attempt to compute pricing bands is made. Lastly, when the selection of the consumer is undated, i.e., no check-in date or proposed date of travel was specified, then the check-in month will default to the month of the current date, and the months used in the display and computation of the pricing bands are determined accordingly.

Returning now to FIG. 7A, once the amount of available rate plan data to use in the computation of the pricing bands has been determined, at process block 714, the rate presenter process 700 obtains the least expensive, "L," rate from the available rate plan data, and, likewise, at process block 716, the most expensive, "M," rate. At process block 718, the rate presenter process 700 subtracts the least expensive rate from the most expensive rate to obtain a range of rates, "R," i.e., R=M−L. The rate presenter process 700 continues at FIG. 7B, at process block 722, to compute the dynamic pricing bands using 'the obtained values for the least and most expensive rates and the resulting range, L, M, and R, according to an N-band algorithm, an example of which is illustrated in detail in FIG. 9. In a preferred embodiment, the pricing band representing the least expensive rates is not actually a range of values, but rather the least expensive rate, L. The remaining pricing bands are ranges of values computed using the values for L and R in the N-band algorithm, as generally expressed in the following equation:

[L+(x−1*(R/N−1))+1]TO[L+(x*(R/N−1))], where x=1 to N−1, and N is the number of pricing bands.

Figure 9:
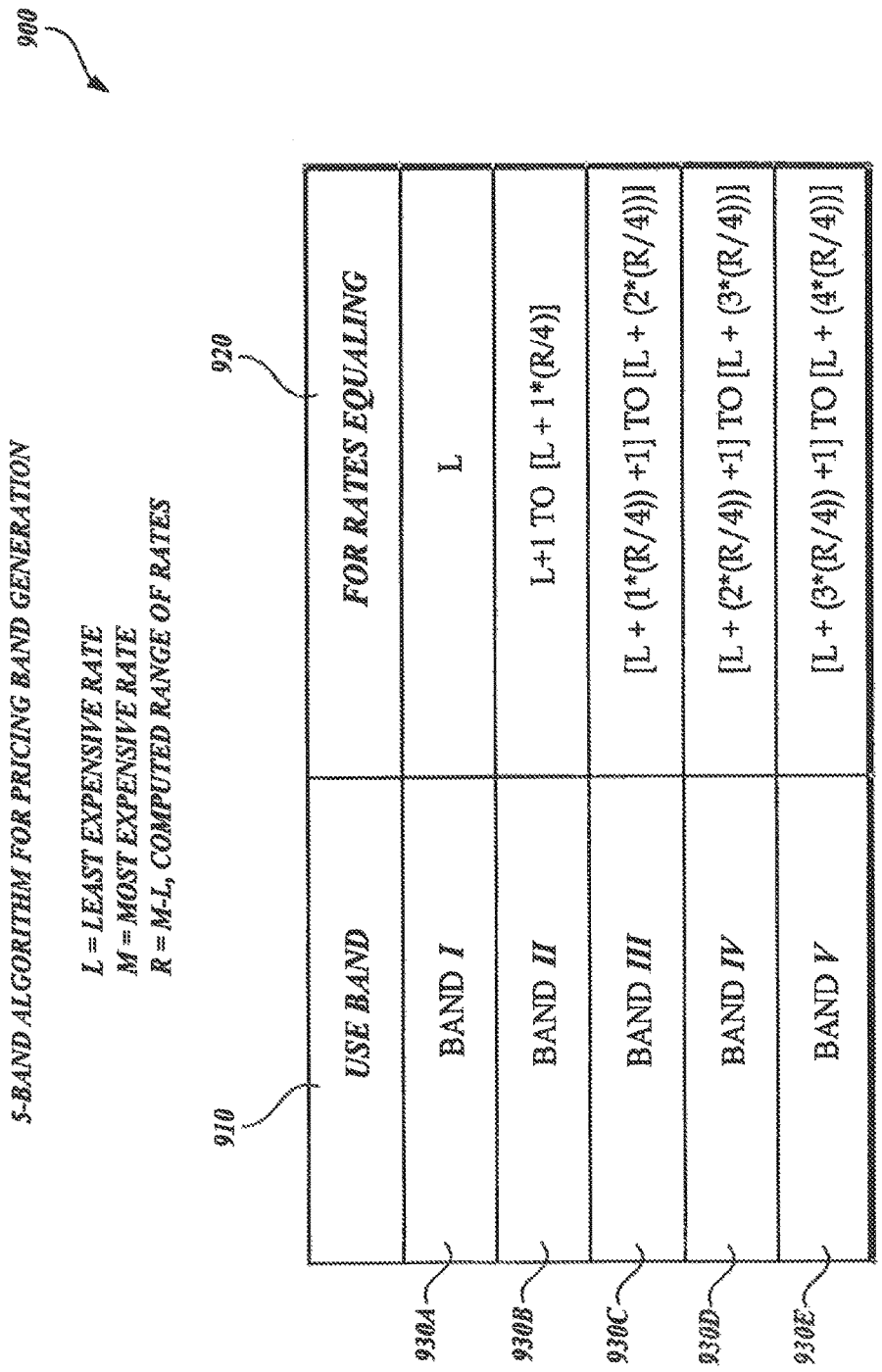
FIG. 9 is a table summarizing an example of a 5-band algorithm used to compute the pricing bands in accordance with an embodiment of the present invention.

In the example illustrated in FIG. 9, the number of dynamic pricing bands 910 is five (5), where Band I, 930A, is used for rates equal to the least expensive rate, L, Band II, 930B, is used for rates ranging from L+1 to [L+1*(R14)], Band III, 930C, is used for rates ranging from L+(1*(R14))+1] to [L+(2*(R14))], Band IV, 930D, is used for rates ranging from L+(2*(R14))+1] to [L+(3*(R14))], and Band V, 930E, is used for rates ranging from L+(3*(R14))+1] to [L+(4*(R14))]. An example computation of five pricing bands using actual rate plan data will be further described below with reference to FIG. 10.

Returning now to FIG. 7B, at process block 724, the rate presenter process 700 assigns a graphical characteristic to each of the computed pricing bands, such as a particular color, that will graphically differentiate for the consumer in an easily accessible manner which rates for the travel service are expensive, and which are not, relative to the rates for other dates proximate to the proposed dates of travel. FIG. 10 illustrates a table 1000 summarizing an example of applying colors to represent dynamic pricing bands in accordance with an embodiment of the present invention. In the illustrated example, the available rate plan data obtained from the cache is subdivided into five pricing bands, where the least expensive rate, L, is determined to be $150 and the most expensive rate, M, is $250, resulting in a total range, R, of $100. As shown, Band I, 1020A, uses the lightest shade of the color green for rates equal to the least expensive rate, L, of $150. Band II, 1020B, uses a medium shade of green for rates ranging from $151 to ($150+25), or $151 to $175. Band III, 1020C, uses a medium-dark shade of green for rates ranging from $176 to ($150+50), or $176 to $200. Band IV, 1020D, uses a dark shade of green for rates ranging from $201 to ($150+75), or $201 to $225. Lastly, Band V, 1020E, uses the darkest shade of green for the most expensive rates ranging from $226 to ($150+$100), or $226 to $250. Although the illustrated example uses different shades of the same color to differentiate one pricing band from another, another graphical characteristic could have been used with equal success, such as different colors altogether, e.g., green for the least expensive, and red for the most expensive, or different patterns of black and white to accommodate monochromatic display screens. In one embodiment, the choice of which type of graphical characteristic to use for each pricing band is delayed until the rates are presented to the client device, permitting the choice to identify a particular brand of travel service provider.

Returning now to FIG. 7B, the rate presenter process 700 continues at process block 726 to generate the cells for each date in the months that will be displayed in the rate calendar interface, where the generation of each cell is based on where the exact rate for each date falls within the dynamic ranges of the computed pricing bands. In one embodiment, the appropriate computed pricing band is associated with the cell, but does not affect the appearance of the cell until the rate calendar interface is actually rendered on the client device to allow the selection of color or other graphical characteristic to identify the particular brand of travel service provider that the consumer is using.

The rate presenter process 700 continues at process block 730 to obtain from the cached rate plan data the exact daily rates for the proposed dates of travel selected by the consumer (or the default current date if the consumer's travel service selection was undated). In one embodiment, the exact daily rates for the proposed dates of travel are posted alongside the monthly calendar display to provide the user with detailed exact rates in addition to the approximate rates represented by the dynamic pricing band colors applied to the monthly calendar display. At process block 732, the rate presenter process 700 further highlights the cells that represent the proposed dates of travel selected by the consumer (or the default current date if the consumer's travel service selection was undated).

Figure 11:
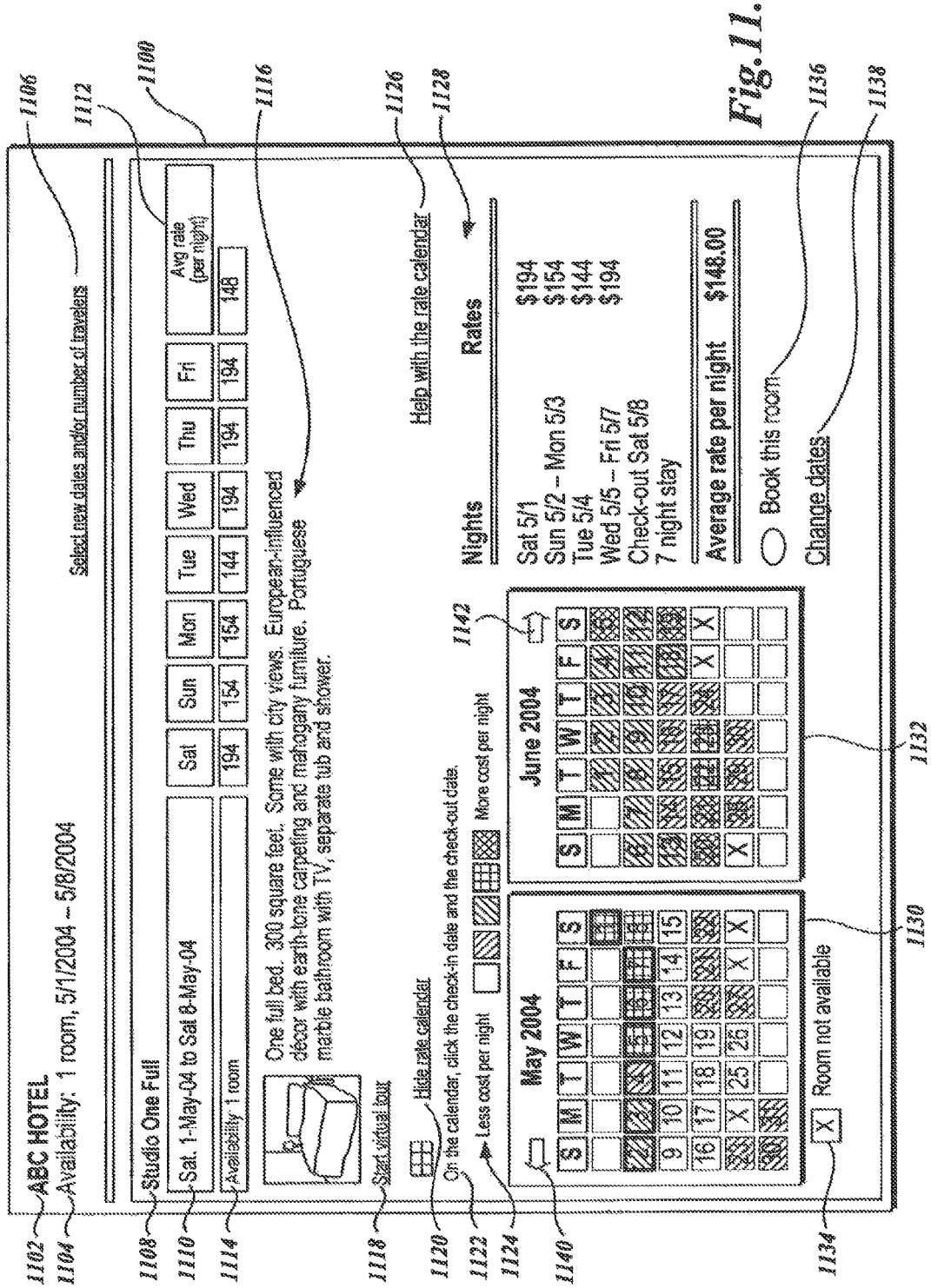

Once the interactive rate calendar has been generated, at process block 734 the rate presenter process 700 displays, or causes the display, of the interactive rate calendar on a client device 102 for the consumer. An example of an interactive rate calendar interface is illustrated in FIG. 11, at reference numeral 1100. The illustrated rate calendar interface 1100 shows a rate calendar for the ABC Hotel, 1102, for the selected travel service of a Studio One Full room, 1108, displayed as available, 1114, for proposed dates in May, with a check-in date of Saturday, May 1, 2004, and a check-out date of May 8, 2004, shown at 1104, 1108. A room description is optionally displayed at 1116, with a link to a virtual tour of the room's amenities at 1118. In the detailed information appearing across the top of the rate calendar interface 1100, the exact rates for the proposed dates of travel are displayed in a weekly format, with the Saturday May 5, 2004 rate of $194, the Sunday 5/2-Monday 5/3 rate of $154, the Tuesday 5/4 rate of $144, the Wednesday 5/5-Friday 5/7 rate of $194, for an average rate per night of $148.

Should the consumer wish to compare how the rates for the proposed dates of travel compare with other nearby dates, a Hide/Display Rate Calendar link at 1120 may be activated to toggle to the displayed months of the rate calendar interface 1100. As shown, the two displayed months are the month in which the check-in date occurs, May 2004, at 1134, and the next month, June 2004, at 1132. Detailed information appearing across the top of the rate calendar interface 1100 is repeated in a tabular format at 1128 alongside the two displayed months. Appearing near the two displayed months is a pattern key 1124 depicting five (5) different patterns used to represent five (5) different pricing bands, such as the previously described Bands I-V in FIGS. 9-10, where the pattern appears in the background of each date in the calendar to indicate whether the cost of the room is less or more cost per night as compared to the other displayed dates in the two displayed monthly calendars. In this example, the pricing bands were computed from six months of cached data, from May 2004 through October 2004.

Also appearing near the two displayed months is an availability key 1134 depicting an X used to mark those dates that are unavailable. As is shown in the two displayed months, certain dates are encoded as unavailable, including May 24, May 28-30, and June 25-27. For the proposed dates of travel, May 1 through May 8, the rates for three of the days, namely Saturday, May 1, and Wednesday through Friday, May 5 through May 7, fall within Band IV, and are so encoded with the pattern for Band IV. Similarly, the rates for Sunday through Monday, May 2 through May 3, fall within Band III, and are so encoded with the pattern for Band III. The rate for Tuesday, May 4, is the least expensive of the rates, falling within Band II, and is so encoded with the pattern for Band II. In one embodiment, the proposed dates of travel are highlighted on the calendar, illustrated here as an emphasis on the outlines of the cells representing the proposed dates of travel. However, the highlighting may be accomplished using any graphical characteristic that calls attention to that portion of the screen in which the cells representing the proposed dates of travel appear.

In actual use of the rate calendar interface 1100 appearing in FIG. 11, the consumer can easily see that if they were to delay their travel to the following week in May, they could take advantage of the lowest rate for the selected room (or at least the lowest rate relative to the rates for the period corresponding to the six months of cached rate plan data that was used to compute the dynamic pricing bands). This is because the rates beginning on Sunday, May 9 through Wednesday, May 19, apparently fall with Band I, and are so encoded with the pattern for Band I (which, in this example, is the absence of a pattern). The consumer can also easily grasp at a glance, that the more expensive rates occur in the following month, the month of June, at 1132, probably due to seasonal variation in demand for rooms in the ABC Hotel.

Figure 12:
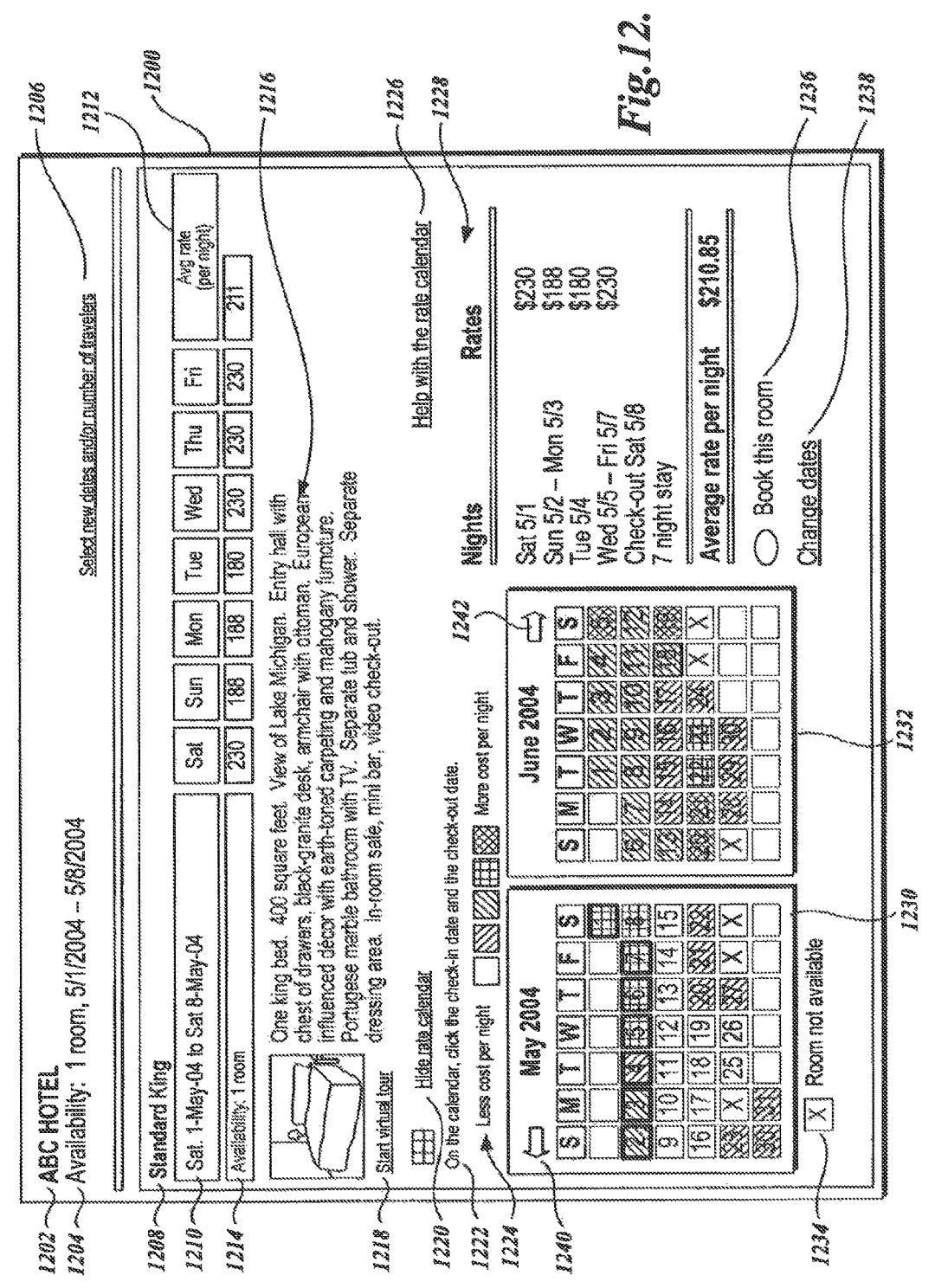

Another example of the rate calendar interface is illustrated in FIG. 12, in the same ABC Hotel 1202, this time for a different selected travel service of a Standard King room 1208, displayed as available at 1214, for same proposed dates in May, with a check-in date of Saturday, May 1, 2004, and a check-out date of May 8, 2004, shown at 1204 and 1210. As in the interface 1100 in FIG. 11, a room description is optionally displayed at 1216, with a link to a virtual tour of the room's amenities at 1218. In the detailed information appearing across the top of the rate calendar interface 1200, the exact rates for the proposed dates of travel are displayed in a weekly format, with the Saturday May 11, 2004 rate of $230, the Sunday 5/2-Monday 5/3 rate of $188, the Tuesday 5/4 rate of $180, the Wednesday 515-Friday 517 rate of $230, for an average rate per night of $211, significantly higher than the rate for the Studio One Full room in the same hotel for the same proposed dates of travel Thus, the consumer can easily determine at a glance by selecting a different type of room, the cost of upgrading to a nicer room in the same hotel for the same dates of travel.

Returning now to FIG. 7C, the rate presenter process 700 responds to consumer input to the interactive rate calendar interface 1100 at decision blocks 738, 740, and 742. For example, at decision block 738, should the consumer wish to explore rates for months other than the display months already viewed in the rate calendar interface 1100 illustrated in FIG. 11, the consumer may click the links provided at 1106 and 1138 to change the proposed dates of travel, or may simply navigate the display months using the navigational arrows at 1140 and 1142 to go back and forth. However, should the new proposed dates of travel cause a change in the determination of pricing band months, as previously described with reference to FIG. 8, for purposes of computing the dynamic pricing bands, then, referring back to FIG. 7C, the rate presenter process 700 branches to the beginning of the process in FIG. 7A, at process block 712 so that the pricing band months may be re-determined and pricing bands recomputed. Referring again to FIG. 7C, should only the dates change, but not the pricing band months, then the rate presenter process 700 branches instead to FIG. 7B at process block 730 to obtain the exact daily rates for the new proposed dates of travel and to refresh the rate calendar interface 1100 to display the detailed information and highlight the proposed dates accordingly.

Figure 13:
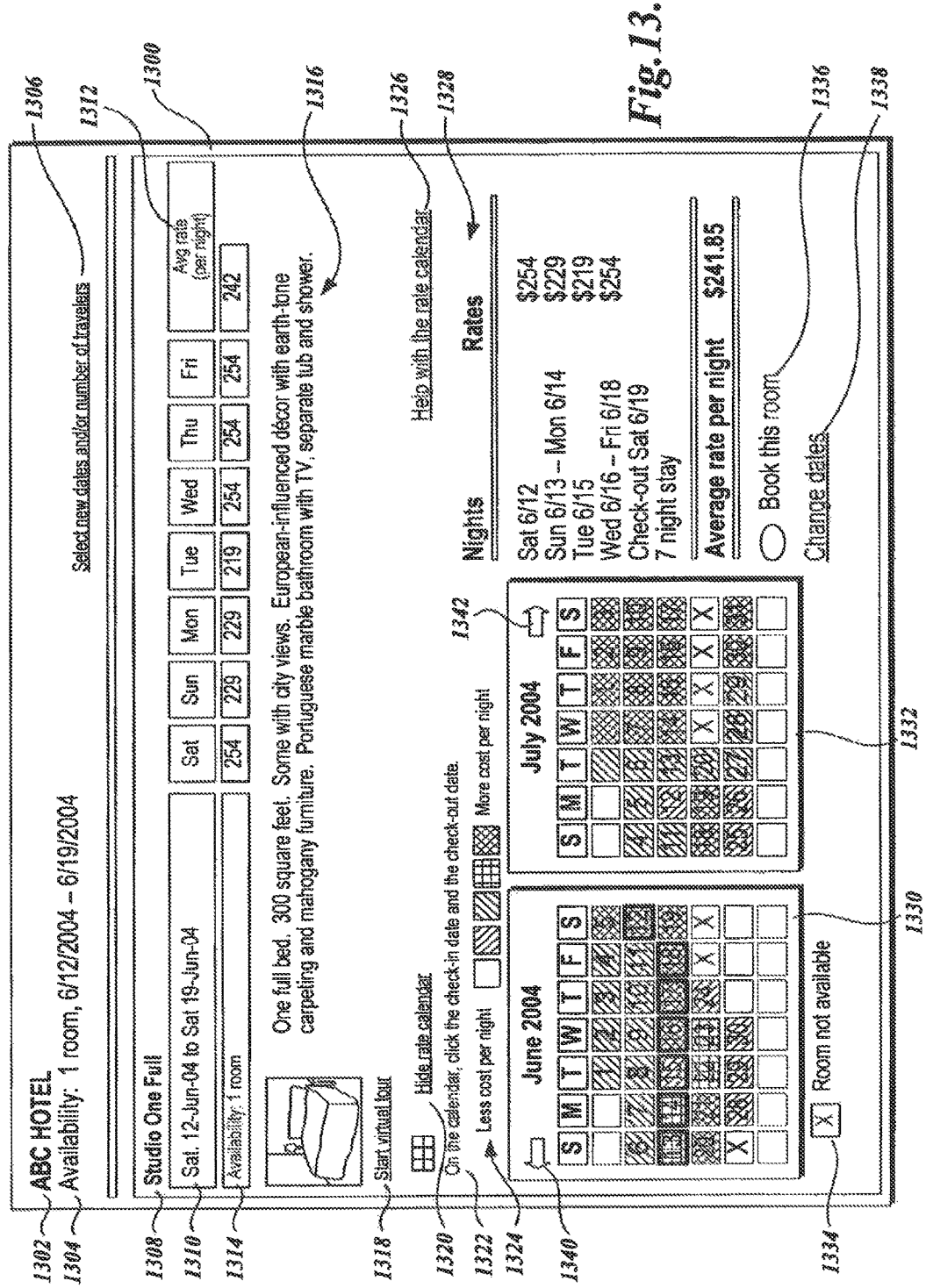

An example of changing the months of proposed travel is illustrated in FIG. 13, in which the proposed dates of travel for the same Studio One Full room selected in the original example illustrated in FIG. 11, is now June 12 through June 19. The display months are now June and July, beginning with the month of June at 1330 instead of the month of May at 1130. For the proposed dates of travel, June 12 through June 19, the rates for three of the days, namely Saturday, June 12, and Wednesday through Friday, June 16 through June 18, fall within Band V, and are so encoded. Similarly, the rates for Sunday through Monday, June 13 through June 14, fall within Band IV, and are so encoded. As before, the rate for Tuesday, June 15, is the least expensive of the rates, falling within Band III, and is so encoded. Although the ranges for the pricing bands has moved upwards, reflecting higher rates, the relationship of the day of week variations in pricing remains the same as before, as is readily appreciated from the appearance of the approximate rates encoded with the corresponding pricing bands in each date of the displayed calendar months, June and July, at 1330 and 1332 respectively. The consumer can also easily see, at a glance, that the rates for travel are increasing as the seasonal price variations for the popular months of summer travel take hold, resulting in more dates encoded with the more expensive pricing bands, Band IV and Band V during the month of July, at 1332, than in the month of June, at 1330.

Returning now to FIG. 7C, should the consumer wish to book travel for the proposed dates, at decision block 742 the rate presenter process 700 determines whether the consumer has activated the book travel link, an example of which is illustrated in FIGS. 11, 12, and 13, at 1136, 1236, and 1336, respectively. If so, the rate presenter process 700 branches at process block 744 to a detailed rate page (not illustrated), and proceeds to book the travel in accordance with the consumer input. At process block 746, the rate presenter process 700 terminates.

Figure 14:
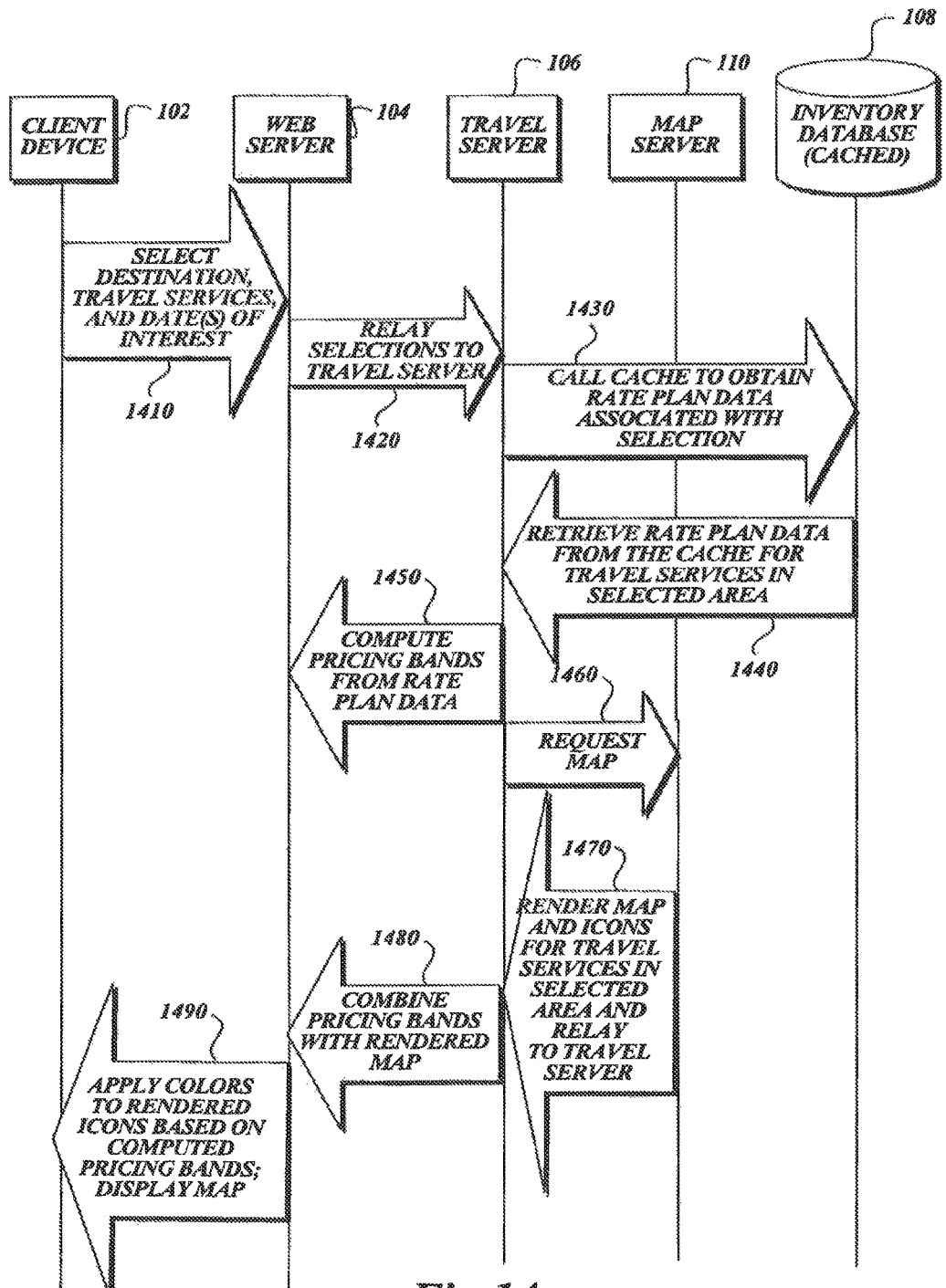
FIG. 14 is a diagram illustrating the actions taken by the devices illustrated in FIG. 1 to present rates for travel services in a map format in response to a travel query in accordance with an embodiment of the present invention.

To better illustrate the presentation of rates for travel services to a consumer using pricing bands in combination with a map interface, FIG. 14 is a diagram illustrating one embodiment of interactions taken by the devices of system 100 illustrated in FIG. 1 to present rates for travel services using pricing bands in a map format in response to a travel query in accordance with an embodiment of the present invention. The devices of the system 100 illustrated in FIG. 14 include a client device 102, Web server 104, a travel server 106, and a map server 110, respectively, and an inventory database 108 that may be accessible directly, or indirectly through a CRS 112, as described with reference to FIG. 1. The interactions of and the processes performed by the various devices are illustrated and described in greater detail with reference to FIGS. 15A-15B.

Returning to FIG. 14, the presentation of rates for travel services to a consumer using pricing bands IS initiated at interactions 1410, 1420, when a Web server 104 relays a consumer's selection of a travel destination and particular travel service in a travel destination and, optionally, the proposed dates of travel, such as the check-in and check-out dates, or if no date has been proposed, the current date as the default, from the client device 102 to the travel server 106 via an interactive rate map interface (such as the rate map interface 1600 illustrated in FIG. 16) that is accessible to the client device 102 and is hosted on the Web server 104.

At interaction 1430, once the travel server 106 receives the consumer's selections, the travel server 106 calls a cache of the inventory database 108 to obtain rate plan data associated with travel services at or near the travel destination for the proposed date or dates. At interaction 1440, the travel server 106 retrieves the rate plan data from the cache, starting with the check-in month plus an additional number of months of rate plan data in accordance with the rules set forth in detail and further described below with reference to FIG. 8. In a typical example, the travel server 106 retrieves two months of rate plan data for the travel services at or near the selected travel destination, starting with the rate plan data for the proposed check-in month. If the selection is undated, the check-in month defaults to the current month. However, other amounts of rate plan data may be retrieved from the cache, either arbitrarily or depending on the proposed dates of travel.

At interaction 1450, the travel server 106 computes a limited number of pricing bands from the rate plan data that was retrieved from the cache according to a pricing band algorithm, as set forth in detail previously described with reference to FIG. 9. Since each hotel is likely to offer a number of different rates for their services depending on the type of room and length of stay, and no particular room within the hotel is typically specified when using the map interface, in one embodiment the travel server 106 computes the average of the lowest daily rates for each hotel for which rate plan data was retrieved from the cache, and uses each hotel's average in the computation of the limited number of pricing bands instead of the exact rate for a particular room on a particular date as was done previously. In an alternate embodiment, such as when the consumer's selection is undated, the travel server 106 uses the median daily rate for each hotel in the computation of the limited number of pricing bands, instead of the average lowest rate. Similar to the calendar implementation, the pricing bands represent dynamic ranges of rates computed from the least and most expensive of the median or average lowest daily rate for each hotel, or other type of travel service. The pricing bands are generally limited in number to no more than five (5) or so bands to facilitate easy comparison of rates by the consumer, but the number may vary depending on the implementation.

At interaction 1460, the travel server 106 requests a map from the map server 110. The map server 110 is typically a third party provider of map interfaces for a specified area, such as the travel destination selected by the consumer. At interaction 1470, the map server 110 renders a map interface of the travel destination, including icons corresponding to the hotels at or near the travel destination for which rate plan date was retrieved from the cache. The rendered map interface is relayed to the travel server 106. At interaction 1480, the travel server 106 combines the computed pricing bands with the rendered map interface to allow the consumer to explore the possible rate variations for comparable travel services in the selected travel destination in an intuitive and user-friendly manner. As will be further described with reference to FIGS. 15A-15B, the travel server 106 associates a particular computed pricing band with each icon depending on where the rate for the travel service that the icon represents falls within the dynamic ranges of the bands.

At interaction 1490, the Web server applies a graphical characteristic to the rendered icons on the map based on the computed pricing band associated with the icon as described previously with reference to FIG. 10. Similar to the rate calendar interface, in a typical embodiment of the rate map interface, the graphical characteristic is a color chosen to convey whether the approximate rate for a particular hotel at or near the travel destination (as represented in the map icon) is expensive or inexpensive as compared to rates for other hotels at or near the travel destination (other icons on the same map).

Figure 15A:
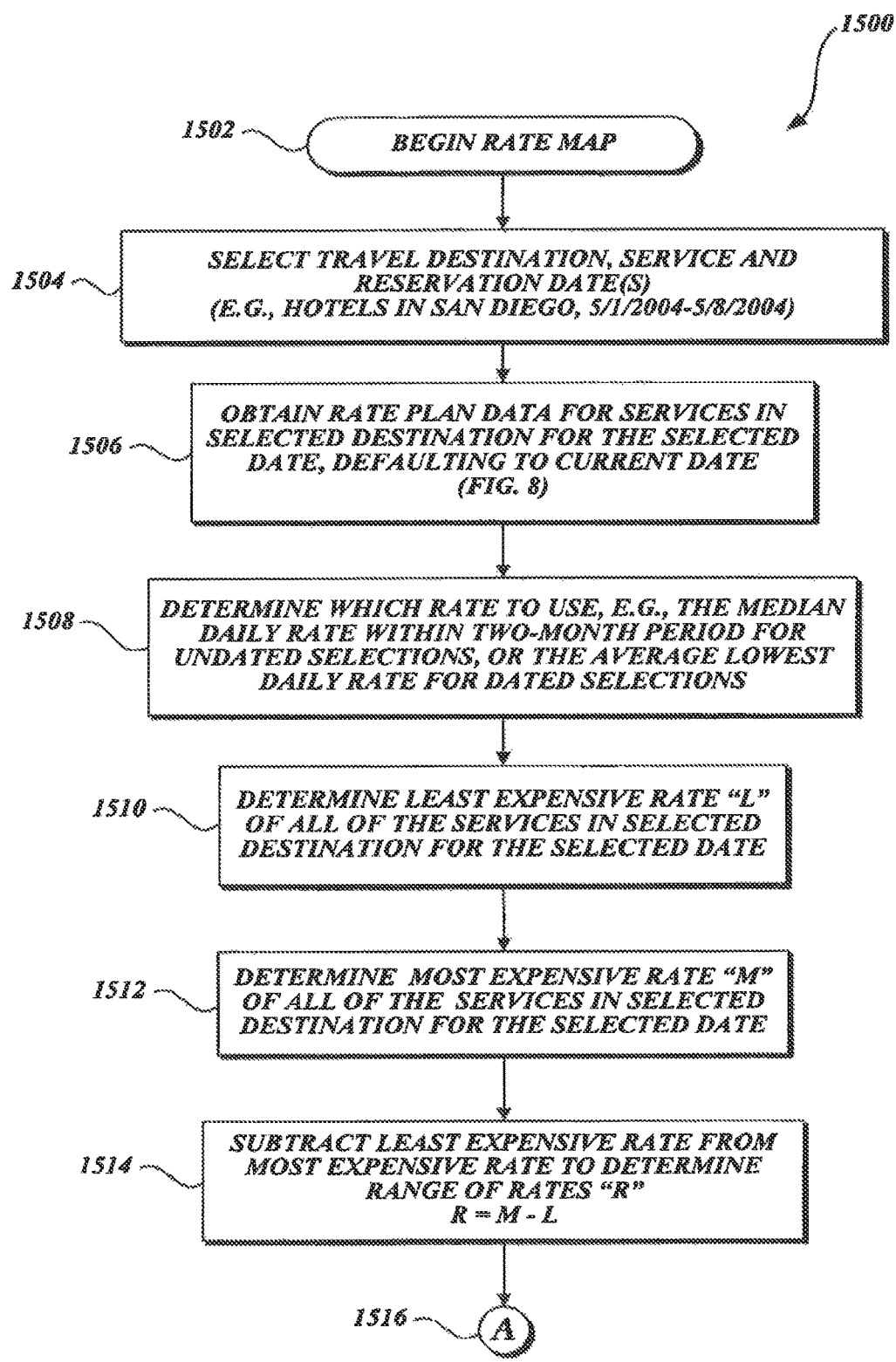
FIGS. 15A-15B is an overview flow diagram illustrating logic implemented using the devices illustrated in FIG. 1 to present rates for travel services in a map format in accordance with an embodiment of the present invention.
Figure 15B:
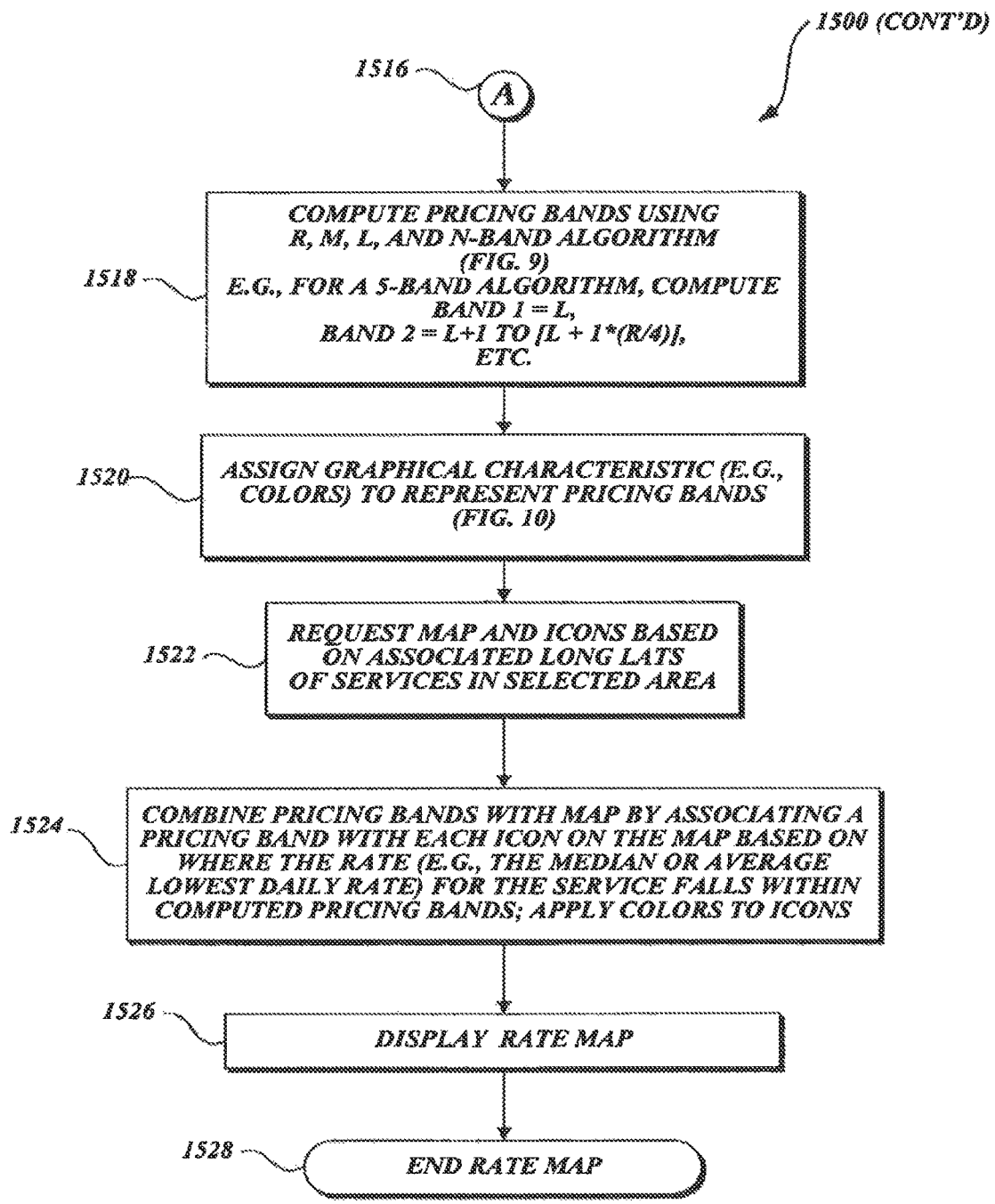

FIGS. 15A-15B are overview flow diagrams illustrating logic implemented using the devices of system 100 illustrated in FIG. 1 to present rates for travel services in a map format in accordance with an embodiment of the present invention. A rate presenter process 1500 implemented by the travel server 106 begins in block 1502 and continues at process block 704 to receive the consumer's selection of a travel destination, such as San Diego, Calif., and optionally, a particular hotel and/or reservation date, such as the ABC Hotel, with a check-in date of May 1, 2004. At process block 1506 the rate presenter process 1500 determines which months of the rate plan data for hotels at or near the consumer's selected travel destination to retrieve from the cache of rate plan data obtained from the inventory database 108. The determination of which months of the rate plan data to retrieve is set forth in further detail as previously described with reference to FIG. 8.

Once the rate plan data has been retrieved, at process block 1508 the rate presenter process 1500 determines which rates to use in the computation of the pricing bands. When the consumer's selection of a travel destination is undated, a preferred default rate to use in the pricing band computation is the median daily rate within a predefined period (typically two months beginning with the current month) for each hotel in the travel destination that will be displayed on the map. This insures that the consumer is comparing rates that are most likely to be comparable from one hotel to the next. Alternatively, when the consumer's selection of a travel destination is dated, i.e., has selected a check-in date and possibly a check-out date, then a preferred rate to use in the pricing band computation is an average of the lowest daily rate for each travel service for each of the selected dates. Using the average of the lowest daily rates for a selected date or dates will generally provide the consumer with a more accurate sense of the rates that are available during the selected dates than just using the median daily rate.

Once the type of rate to use has been determined, at process block 1510, the, rate presenter process 1500 obtains the least expensive, "L," rate from the available rate plan data. For example, when using the average of the lowest daily rates for a selected date or dates, the least expensive "L" rate is the least expensive of the average lowest daily rates among all of the hotel in the selected travel destination, i.e., the lowest of the average lowest rates. When using the median daily rate occurring during a two-month period, the least expensive "L" rate is the least expensive of the median daily rates among all of the hotels in the selected travel destination, i.e., the lowest of the median rates. Likewise, at process block 1512, the rate presenter process 1500 obtains the most expensive, "M," rate from the available rate plan data in a similar manner. At process block 1514, the rate presenter process 1500 subtracts the least expensive rate from the most expensive rate to obtain a range of rates, "R," i.e., R=M−L. The rate presenter process 1500 continues at FIG. 15B, at process block 1516, to compute the dynamic pricing bands using the obtained values for the least and most expensive rates and the resulting range, L, M, and R, according to an N-band algorithm, an example of which has been illustrated and previously described in detail in FIG. 9.

Returning now to FIG. 15B, at process block 1520, the rate presenter process 1500 assigns a graphical characteristic to each of the computed pricing bands, such as a particular color, that will graphically differentiate for the consumer in an easily accessible manner which rates for a hotel are expensive, and which are not, relative to the rates for other hotels at or near the selected travel destination. As previously described, FIG. 10 illustrates a table 1000 summarizing an example of applying colors to represent dynamic pricing bands in accordance with an embodiment of the present invention.

Returning now to FIG. 15B, the rate presenter process 1500 continues at process block 1522 to request a map of the selected travel destination as well as icons corresponding to the hotels at or near the selected travel destination appropriately geographically positioned on the map. In one embodiment, the map and icons are requested from a third party map provider by the associated longitude and latitude geographical designations associated with the selected destination and hotels.

The rate presenter process 1500 continues at process block 1524 to combine the computed pricing bands with the map by associating a pricing band with each icon on the map based on where the rate for the hotel (e.g., the lowest or the average of the lowest daily rate for the hotel, as the case may be) falls within the dynamic ranges of the computed pricing bands. The rate presenter process 1500 may also at this time apply the assigned graphical characteristics to the icons. In one embodiment, the assignment and application of the graphical characteristic to the icons is delayed until the rate map interface is actually rendered on the client device to allow the selection of the color or other graphical characteristic to identify the particular brand of travel service provider that the consumer is using.

Figure 16:
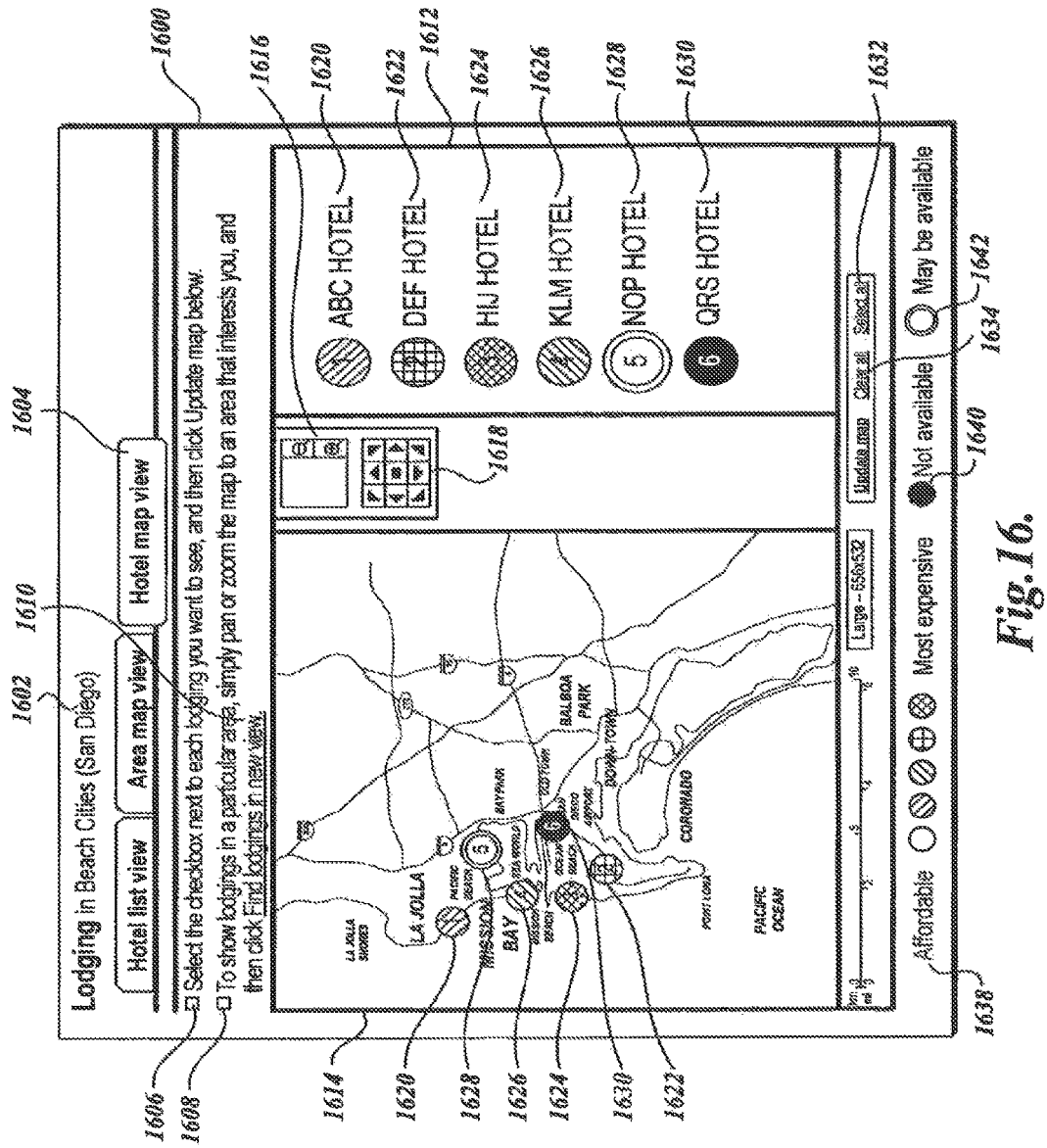
FIG. 16 illustrates exemplary Web pages for presenting rates for travel services in a map format in accordance with an embodiment of the present invention.

Once the interactive rate map and icons have been generated, at process block 1526 the rate presenter process 1500 displays, or causes the display, of the interactive rate map interface 1600 on a client device 102 for the consumer. An example of an interactive rate map interface is illustrated in FIG. 16, at reference numeral 1600. The illustrated rate map interface 1600 entitled "Lodging in Beach Cities (San Diego)" at 1602, in which a hotel map view 1604 tabbed display has been selected that includes an area map 1614 for the travel destination of San Diego, Calif. On the area map 1614 is superimposed icons designating the locations of six different area lodgings, e.g., ABC Hotel 1620, DEF Hotel 1622, HIJ Hotel 1624, KLM Hotel 1626, NOP Hotel 1628, and QRS Hotel 1630. User instructions for interacting with the map are supplied at reference numerals 1606 and 1608, and the icons on the map may be cleared or selected using the links provided at reference numbers 1632 and 1634.

Appearing beneath the displayed map 1614 is a pattern key 1638 depicting five (5) different patterns used to represent five (5) different pricing bands, such as the previously described Bands I-V in FIGS. 9-10, where the pattern appears in the background of each icon in the map 1614 to indicate whether the hotel is more or less affordable as compared to the other hotels represented by the other displayed icons on the map. As is shown in the displayed map 1614, the ABC Hotel at 1620 is displayed as an icon encoded with the pattern assigned to the second to least expensive of the hotels in Band II, The DEF Hotel at 1622 is displayed as an icon encoded with the pattern assigned to the second most expensive of the hotels in Band IV. The HIJ Hotel at 1624 is displayed as an icon encoded with the pattern assigned to the most expensive of the hotels in Band V. The KLM Hotel at 1626 is displayed as an icon encoded with the pattern assigned to the third most expensive of the hotels in Band III. Lastly, the NOP hotel at 1628 is displayed as an icon encoded with the pattern assigned to the least expensive of the hotels in Band I. Also appearing near the displayed map 1614 is an availability key 1642, 1642, depicting blacked out or clear icons to designate those hotels that are not available as opposed to those that may be available. As is shown in the displayed map 1614, only one of the hotels, namely the "QRS Hotel" is encoded as unavailable.

In actual use of the rate map interface 1600 appearing in FIG. 16, the consumer can easily see that the ABC Hotel is a more affordable hotel than the HIJ Hotel, which is closer to the downtown San Diego area. The consumer can also easily grasp at a glance, that the more expensive rates occur at hotels located near the downtown San Diego area.

While the presently preferred embodiments of the invention have been illustrated and described, it will be appreciated that various changes may be made therein without departing from the spirit and scope of the invention. For example, although the dynamic pricing bands have been primarily described and depicted as being keyed to a particular color or pattern, they could also be keyed to a particular sound, or a combination of graphical and audio characteristics, including an animated audiovisual characteristic.

What is claimed is:

1. A computer-implemented method for presenting rates for travel services, the method, as implemented by one or more computing devices, comprising:
    obtaining a dynamic range of available rates for a travel service over a selected date range;
    subdividing the dynamic range of available rates into a plurality of pricing bands, wherein each of the plurality of pricing bands represents a portion of the dynamic range of available rates;
    determining an approximate rate for the travel service based at least in part on a pricing band, of the plurality of pricing bands, within which an exact rate for the travel service on a first date of the selected date range falls; and
    causing, in an interactive interface, presentation of the approximate rate for the travel service using a characteristic associated with the pricing band, the approximate rate presented concurrently with an additional approximate rate for the travel service on one or more alternative dates of the selected date range, the additional approximate rate presented using a second characteristic associated with a second pricing band of the plurality of pricing bands.

2. The computer-implemented method of claim 1 further comprising selecting the selected data range based at least in part on a proposed date of travel.

3. The computer-implemented method of claim 1, wherein the interactive interface is an interactive calendar in which the characteristic associated with the pricing band is displayed in a particular cell of the interactive calendar that represents the first date.

4. The computer-implemented method of claim 2, wherein the selected date range includes a month during or close to which a proposed date of travel occurs plus an additional number of months proximate to the month during or close to which the proposed date of travel occurs.

5. The computer-implemented method of claim 1, wherein the interactive calendar includes cells, and wherein the cells of the interactive calendar represent a month beyond the period of time for which rates for the travel service can be obtained and the cells are displayed with a different graphical characteristic conveying that rates were not obtainable.

6. The computer-implemented method of claim 1, wherein obtaining the dynamic range of available rates for the travel service over the selected date range includes obtaining available rates for travel providers located at or near a proposed destination of travel during or close to a proposed date of travel, and wherein the exact rate for the travel service on the first date includes a rate for a particular travel provider located at or near the proposed destination on the proposed date.

7. The computer-implemented method of claim 6, wherein the interactive interface is an interactive map in which the characteristic is displayed in an icon superimposed in a location on the interactive map, wherein the icon represents the particular travel provider located at or near the proposed destination.

8. The computer-implemented method of claim 1, wherein the dynamic range reflects a least expensive average lowest rate to a most expensive average lowest rate available during the selected date range.

9. The computer-implemented method of claim 1, wherein wherein the dynamic range of available rates is based at least partly on a length of stay.

10. A system for presenting rates for travel services, the system comprising:
    an electronic data store configured to store at least specific computer-executable instructions; and
    one or more computing devices in communication with the electronic data store and configured to implement the specific computer-executable instructions to at least:
        obtain a dynamic range of available rates for a travel service over a selected date range;
        subdivide the dynamic range of available rates into a plurality of pricing bands, wherein each of the plurality of pricing bands represents a portion of the dynamic range of available rates;
        determine an approximate rate for the travel service based at least partly on a pricing band, of the plurality of pricing bands, within which an exact rate for the travel service on a first date of the selected date range falls; and
        cause, in an interactive rate interface, presentation of the approximate rate for the travel service using a characteristic associated with the pricing band, the approximate rate presented concurrently with an additional approximate rate for the travel service on one or more alternative dates of the selected date range, the additional approximate rate presented using a second characteristic associated with a second pricing band of the plurality of pricing bands.

11. The system of claim 10, wherein the the specific computer-executable instructions cause the one or more computing devices to subdivide the dynamic range of available rates into the plurality of pricing bands based at least partly on the least and most expensive rates within the dynamic rate of available rates.

12. The system of claim 10, wherein the the specific computer-executable instructions cause the one or more computing devices to select the selected date range based at least partly on a proposed date of travel, and wherein the first date is a date during or close to the proposed date of travel.

13. The system of claim 12, wherein the dynamic range of available rates includes rates for travel providers located at or near a proposed destination of travel on a proposed date of travel, and the approximate rate for the travel service on the first date is the approximate rate for a particular travel provider located at or near the proposed destination on the first date.

14. The system of claim 10, wherein the interactive rate interface is an interactive calendar in which the characteristic associated with pricing band is displayed in a particular cell of the interactive calendar, the particular cell representing the first date.

15. The system of claim 14, wherein cells of the interactive calendar represent a month beyond the period of time for which rates for the travel service can be obtained and the cells are displayed with a different graphical characteristic conveying that rates were not obtainable.

16. The system of claim 10, wherein the selected date range includes a month during or close to which a proposed date of travel occurs plus an additional number of months proximate to the month during or close to which the proposed date of travel occurs.

17. The system of claim 10, wherein the interactive rate interface is an interactive map in which the characteristic is displayed in an icon superimposed in a location on the interactive map, wherein the icon represents the particular travel provider located at or near the proposed destination.

18. The system of claim 10, wherein the dynamic range of available rates based at least partly on a length of stay.

* * * * *